United States Patent
Sasaki et al.

(10) Patent No.: US 9,495,980 B1
(45) Date of Patent: Nov. 15, 2016

(54) MAGNETIC HEAD FOR PERPENDICULAR MAGNETIC RECORDING WITH A COIL INCLUDING TWO COIL PORTIONS

(71) Applicants: Yoshitaka Sasaki, Santa Clara, CA (US); Hiroyuki Ito, Milpitas, CA (US); Kazuki Sato, Milpitas, CA (US); Hironori Araki, Milpitas, CA (US); Kazumasa Yasuda, Sunnyvale, CA (US); Kenichi Takano, Milpitas, CA (US)

(72) Inventors: Yoshitaka Sasaki, Santa Clara, CA (US); Hiroyuki Ito, Milpitas, CA (US); Kazuki Sato, Milpitas, CA (US); Hironori Araki, Milpitas, CA (US); Kazumasa Yasuda, Sunnyvale, CA (US); Kenichi Takano, Milpitas, CA (US)

(73) Assignee: HEADWAY TECHNOLOGIES, INC., Milpitas, CA (US)

( * ) Notice: Subject to any disclaimer, the term of this patent is extended or adjusted under 35 U.S.C. 154(b) by 0 days.

(21) Appl. No.: 14/886,900

(22) Filed: Oct. 19, 2015

(51) Int. Cl.
  *G11B 5/127* (2006.01)
  *G11B 5/39* (2006.01)
(52) U.S. Cl.
  CPC ........... *G11B 5/1278* (2013.01); *G11B 5/3912* (2013.01)
(58) Field of Classification Search
  None
  See application file for complete search history.

(56) References Cited

U.S. PATENT DOCUMENTS

| | | | | |
|---|---|---|---|---|
| 8,441,755 | B2* | 5/2013 | Sasaki | G11B 5/17 360/123.03 |
| 8,498,077 | B1* | 7/2013 | Sasaki | G11B 5/1278 360/123.06 |
| 8,537,495 | B1* | 9/2013 | Luo | G11B 5/1278 360/125.07 |
| 8,780,497 | B2* | 7/2014 | Sasaki | G11B 5/17 360/123.06 |
| 8,810,963 | B1 | 8/2014 | Sasaki et al. | |
| 8,817,418 | B1* | 8/2014 | Matsuo | G11B 5/315 360/125.02 |
| 2012/0188666 | A1* | 7/2012 | Sasaki | G11B 5/1278 360/123.12 |
| 2012/0262825 | A1* | 10/2012 | Sasaki | G11B 5/1278 360/244 |
| 2012/0314323 | A1* | 12/2012 | Sasaki | G11B 5/1278 360/123.05 |
| 2013/0329319 | A1* | 12/2013 | Sasaki | G11B 5/17 360/123.12 |

\* cited by examiner

*Primary Examiner* — Will J Klimowicz
(74) *Attorney, Agent, or Firm* — Oliff PLC

(57) ABSTRACT

A magnetic head includes a coil, a main pole and a return path section. The return path section includes a yoke section, and a coupling section coupling the yoke section to the main pole. The coil includes a first coil portion surrounding at least part of an outer peripheral surface of the coupling section, and a second coil portion surrounding at least part of the entire perimeter of the main pole as viewed from the medium facing surface. The winding of the coil includes a common portion used in common to form part of the first coil portion and part of the second coil portion.

10 Claims, 36 Drawing Sheets

MAGNETIC HEAD FOR PERPENDICULAR MAGNETIC RECORDING WITH A COIL INCLUDING TWO COIL PORTIONS

BACKGROUND OF THE INVENTION

1. Field of the Invention

The present invention relates to a magnetic head for perpendicular magnetic recording for use to write data on a recording medium by means of a perpendicular magnetic recording system.

2. Description of the Related Art

The recording systems of magnetic read/write apparatuses include a longitudinal magnetic recording system in which the magnetization of signals is directed along the plane of a recording medium (the longitudinal direction), and a perpendicular magnetic recording system in which the magnetization of signals is directed perpendicular to the plane of a recording medium. It is known that the perpendicular magnetic recording system is harder to be affected by thermal fluctuation of the recording medium and capable of providing higher linear recording density, compared with the longitudinal magnetic recording system.

Magnetic heads for perpendicular magnetic recording typically have, like those for longitudinal magnetic recording, a structure in which a read head unit having a magnetoresistive element (hereinafter, also referred to as MR element) for reading and a write head unit having an induction-type electromagnetic transducer for writing are stacked on a substrate. The write head unit includes a coil, a main pole and a return path section. The main pole has an end face located in a medium facing surface facing a recording medium. The coil produces a magnetic field corresponding to data to be written on the recording medium. The main pole passes a magnetic flux corresponding to the magnetic field produced by the coil, and produces a write magnetic field from its end face. The return path section is connected to the main pole. The return path section passes the magnetic flux corresponding to the magnetic field produced by the coil.

A magnetic head for use in a magnetic disk drive such as a hard disk drive is typically provided in a slider. The slider has the medium facing surface. The medium facing surface has an air inflow end (a leading end) and an air outflow end (a trailing end). An airflow that comes from the air inflow end into the space between the medium facing surface and the recording medium causes the slider to slightly fly over the surface of the recording medium.

Here, the side of the positions closer to the leading end relative to a reference position will be referred to as the leading side, and the side of the positions closer to the trailing end relative to the reference position will be referred to as the trailing side. The leading side is the rear side in the direction of travel of the recording medium relative to the slider. The trailing side is the front side in the direction of travel of the recording medium relative to the slider.

Magnetic heads for perpendicular magnetic recording are increasing in frequency of write signals to achieve higher recording densities. For such magnetic heads, it is thus required that the write current flowing through the coil should exhibit a rapid rise. To meet the requirement, it is effective to shorten the magnetic path through which the magnetic flux produced by the coil passes. To achieve this, reducing the number of turns of the coil is effective. However, a reduction in the number of turns of the coil would make the coil unable to provide a sufficiently large magnetomotive force.

Coils for use in magnetic heads for perpendicular magnetic recording are broadly classified into two types as follows. A first type is one that is wound around a portion of the return path section and not around the main pole. A second type is one that is wound around the main pole.

U.S. Pat. No. 8,810,963 B1 discloses a magnetic head including both of a coil of the first type and a coil of the second type. In this magnetic head, the coil of the first type and the coil of the second type are formed as completely separate coils. Further, in this magnetic head, a return path section is provided on the leading side of the main pole so as to define a space for respective portions of the coils of the first and second types to pass through. Since the space needs to be large, this magnetic head must disadvantageously include a long magnetic path formed by the main pole and the return path section which define the large space.

OBJECT AND SUMMARY OF THE INVENTION

It is an object of the present invention to provide a magnetic head for perpendicular magnetic recording that achieves a reduction in length of the magnetic path for passing a magnetic flux produced by the coil, and allows the coil to provide a sufficiently large magnetomotive force.

A magnetic head for perpendicular magnetic recording of the present invention includes a medium facing surface configured to face a recording medium, a coil for producing a magnetic field corresponding to data to be written on the recording medium, a main pole, and a return path section formed of a magnetic material. The main pole has an end face located in the medium facing surface. The main pole is configured to pass a magnetic flux corresponding to the magnetic field produced by the coil, and to produce a write magnetic field for use to write data on the recording medium by means of a perpendicular magnetic recording system. The return path section is connected to the main pole and configured to pass a magnetic flux corresponding to the magnetic field produced by the coil.

The return path section includes a first yoke section and a first coupling section. The first yoke section lies at a different location from the main pole in the direction of travel of the recording medium. The first coupling section is located away from the medium facing surface and couples the first yoke section to the main pole. The first coupling section has an outer peripheral surface in contact with neither of the main pole and the first yoke section.

The coil includes a first coil portion and a second coil portion. The first coil portion surrounds at least part of the outer peripheral surface of the first coupling section. The second coil portion surrounds at least part of the entire perimeter of the main pole as viewed from the medium facing surface. The coil includes a winding for forming the first and second coil portions. The winding includes a common portion, a first dedicated portion and a second dedicated portion. The common portion extends to pass through between the main pole and the first yoke section, and is used in common to form part of the first coil portion and part of the second coil portion. The first dedicated portion is connected to the common portion and used to form the remainder of the first coil portion. The second dedicated portion is connected to the common portion and used to form the remainder of the second coil portion.

In the magnetic head of the present invention, the first dedicated portion, the common portion and the second dedicated portion may be connected in series in this order.

In the magnetic head of the present invention, the first dedicated portion may include a first connection and a second connection at mutually different locations. The second dedicated portion may include a third connection and a fourth connection at mutually different locations. The first connection and the third connection are connected to each other. The second connection and the fourth connection are connected to each other, and connected to the common portion.

In the magnetic head of the present invention, each of the first and second coil portions may be of one turn or less. The common portion may be formed only of a single coil element. The term "coil element" refers to part of the winding of the coil.

In the magnetic head of the present invention, the return path section may further include a second yoke section and a second coupling section. The second yoke section is located on a side of the main pole opposite from the first yoke section. The second coupling section is located away from the medium facing surface and couples the second yoke section to the main pole. The second coupling section has an outer peripheral surface in contact with neither of the main pole and the second yoke section. The coil may further include a third coil portion surrounding at least part of the outer peripheral surface of the second coupling section. The winding may further include a third dedicated portion used to form at least part of the third coil portion. In this case, the first dedicated portion, the common portion, the second dedicated portion and the third dedicated portion may be connected in series in this order. The second dedicated portion may include: a first portion extending to pass through between the main pole and the second yoke section and used in common to form part of the third coil portion and part of the second coil portion; and a second portion connecting the first portion to the common portion.

In the magnetic head of the present invention, the first yoke section may be located on the rear side in the direction of travel of the recording medium relative to the main pole. In this case, the main pole may include: a bottom surface located at the rear-side end in the direction of travel of the recording medium; a top surface located at the front-side end in the direction of travel of the recording medium; and a first side surface and a second side surface located at opposite ends in the track width direction. The second dedicated portion may extend along the top surface and the first and second side surfaces of the main pole without contacting them.

In the magnetic head of the present invention, the first yoke section may be located on the front side in the direction of travel of the recording medium relative to the main pole. In this case, the main pole may include: a bottom surface located at the rear-side end in the direction of travel of the recording medium; a top surface located at the front-side end in the direction of travel of the recording medium; and a first side surface and a second side surface located at opposite ends in the track width direction. The second dedicated portion may extend along the bottom surface and the first and second side surfaces of the main pole without contacting them.

In the magnetic head of the present invention, the winding of the coil includes the common portion extending to pass through between the main pole and the first yoke section and used in common to form part of the first coil portion and part of the second coil portion. According to the present invention, it is thus possible to reduce the length of the magnetic path that defines a space for the common portion to pass through, and passes the magnetic flux produced by the coil. Further, according to the present invention, since the coil includes the first and second coil portions, it is possible for the coil to provide a sufficiently large magnetomotive force.

Other objects, features and advantages of the present invention will become fully apparent from the following description.

DETAILED DESCRIPTION OF THE PREFERRED EMBODIMENTS

First Embodiment

Figure 2:
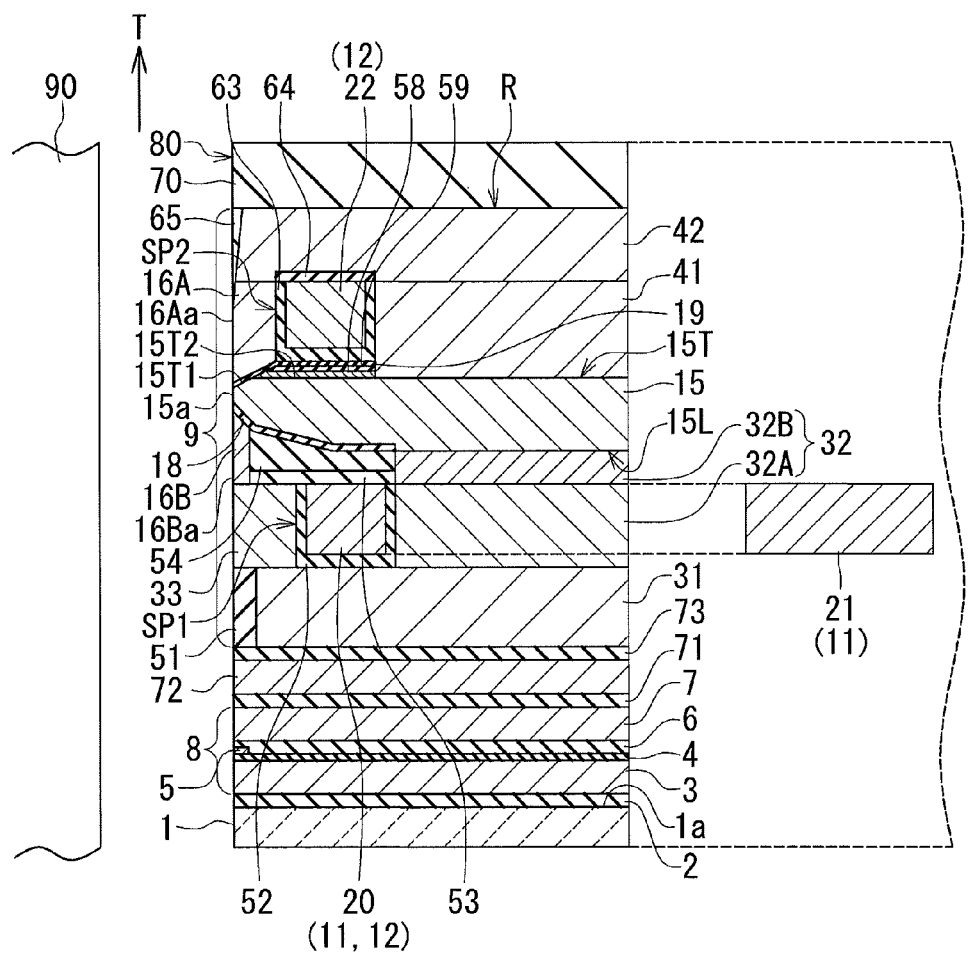
FIG. 2 is a cross-sectional view of the magnetic head according to the first embodiment of the invention.
Figure 3:
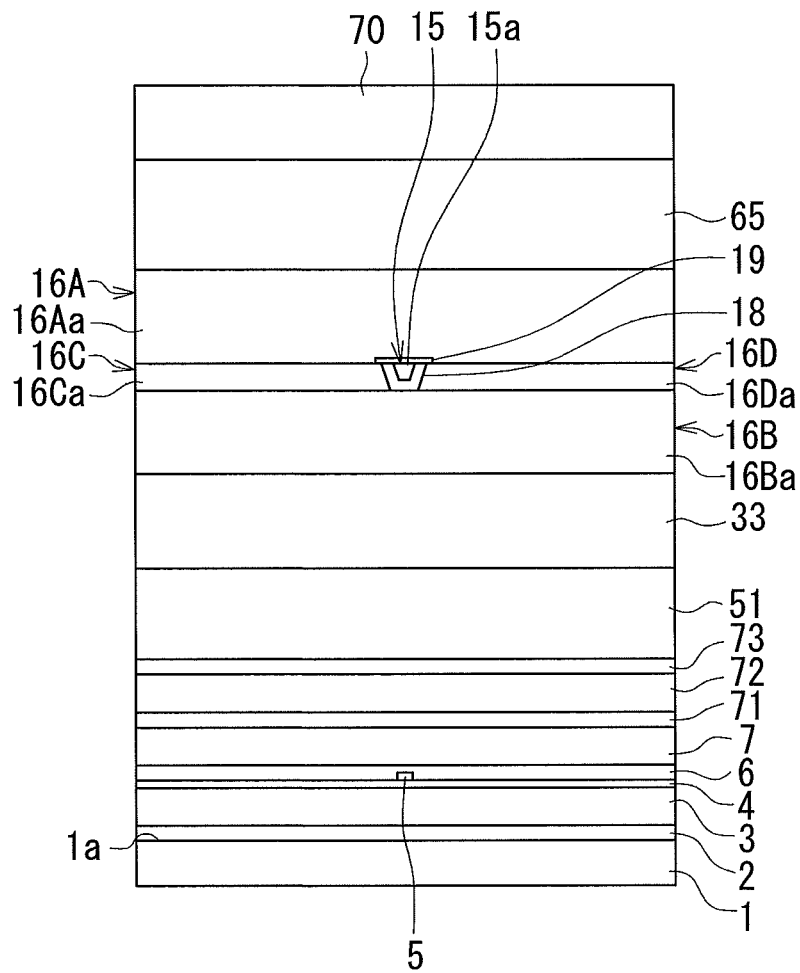
FIG. 3 is a front view showing the medium facing surface of the magnetic head according to the first embodiment of the invention.
Figure 4:
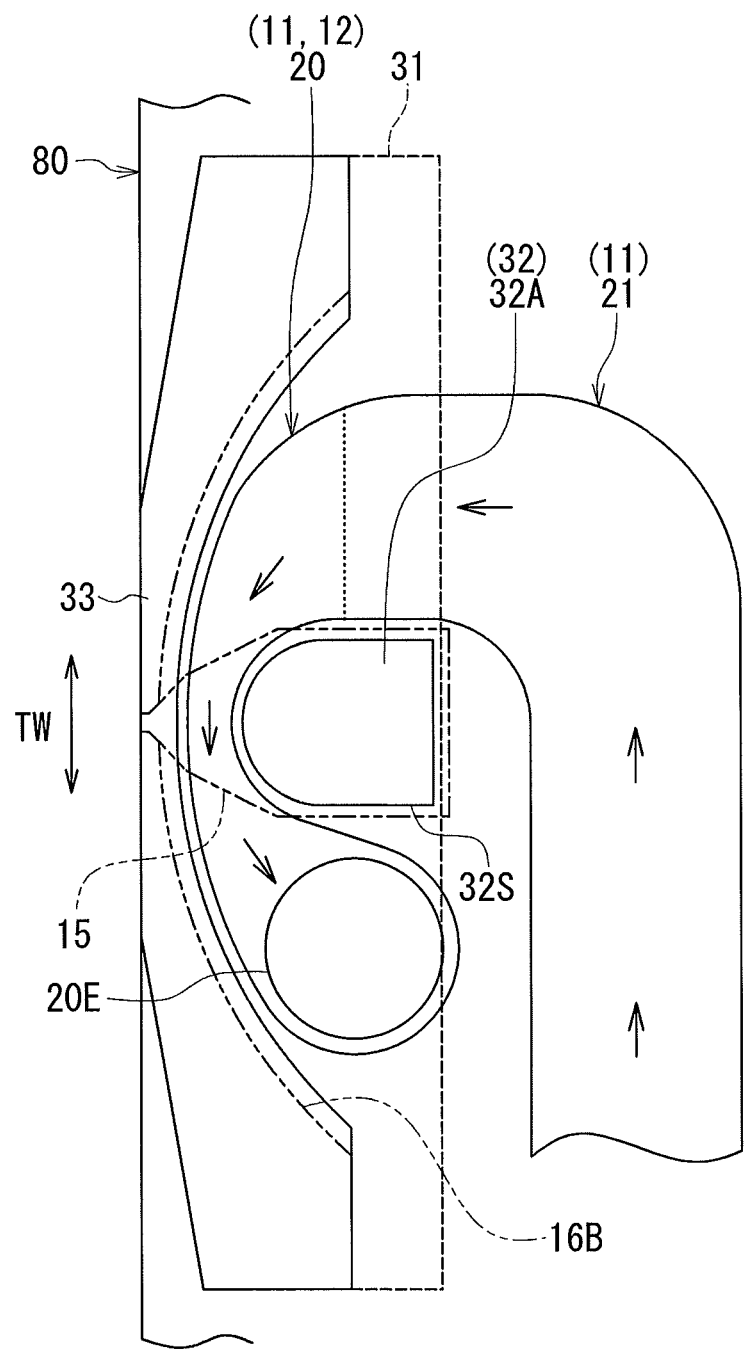
FIG. 4 is a plan view showing a common portion and a first dedicated portion of a winding of a coil of the magnetic head according to the first embodiment of the invention.
Figure 5:
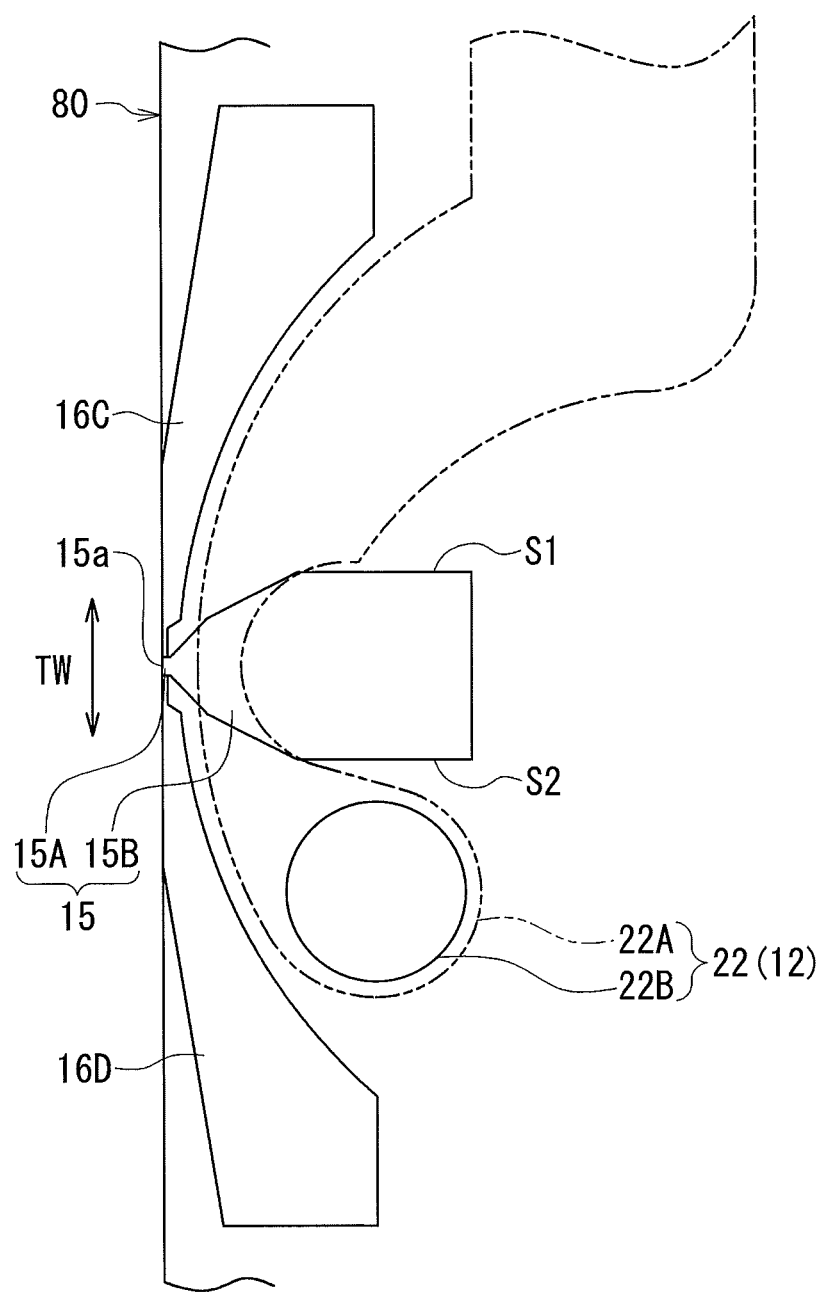
FIG. 5 is a plan view showing a main pole, a first side shield and a second side shield of the magnetic head according to the first embodiment of the invention.
Figure 6:
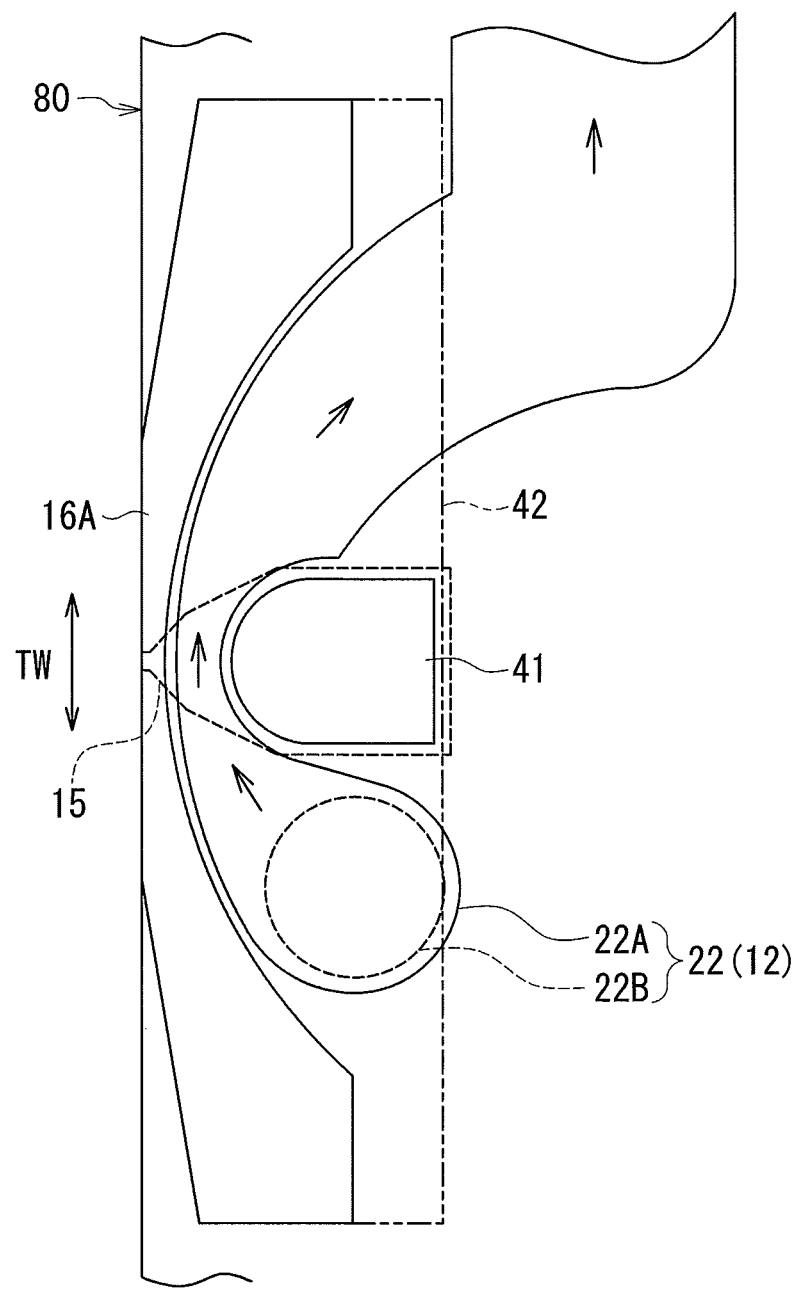
FIG. 6 is a plan view showing a second dedicated portion of the winding of the coil of the magnetic head according to the first embodiment of the invention.

Preferred embodiments of the present invention will now be described in detail with reference to the drawings. First, reference is made to FIG. 2 to FIG. 6 to describe the configuration of a magnetic head for perpendicular magnetic recording (hereinafter simply referred to as magnetic head) according to a first embodiment of the invention. FIG. 2 is a cross-sectional view of the magnetic head according to the present embodiment. The arrow labeled T in FIG. 2 indicates the direction of travel of a recording medium. FIG. 3 is a front view showing the medium facing surface of the magnetic head according to the present embodiment. FIG. 4 is a plan view showing a common portion and a first dedicated portion of a winding of a coil of the magnetic head according to the present embodiment. FIG. 5 is a plan view showing a main pole, a first side shield and a second side shield of the magnetic head according to the present embodiment. FIG. 6 is a plan view showing a second dedicated portion of the winding of the coil of the magnetic head according to the present embodiment. The arrow labeled TW in FIG. 3 to FIG. 6 indicates the track width direction.

The magnetic head according to the present embodiment is for use in, for example, a magnetic disk drive, and is incorporated in a slider configured to fly over the surface of a rotating recording medium 90. The slider has a medium facing surface 80 configured to face the recording medium 90. The medium facing surface 80 has an air inflow end (a leading end) and an air outflow end (a trailing end). An airflow that comes from the leading end into the space between the medium facing surface 80 and the recording medium 90 causes the slider to slightly fly over the surface of the recording medium 90.

Here, the side of the positions closer to the leading end relative to a reference position will be referred to as the leading side, and the side of the positions closer to the trailing end relative to the reference position will be referred to as the trailing side. The leading side is the rear side in the direction T of travel of the recording medium 90 relative to the slider. The trailing side is the front side in the direction T of travel of the recording medium 90 relative to the slider.

As shown in FIG. 2, the magnetic head has the medium facing surface 80 mentioned above. As shown in FIG. 2 and FIG. 3, the magnetic head includes: a substrate 1 formed of a ceramic material such as aluminum oxide-titanium carbide ($Al_2O_3$—TiC) and having a top surface 1a; an insulating layer 2 formed of an insulating material such as alumina ($Al_2O_3$) and disposed on the top surface 1a of the substrate 1; a first read shield layer 3 formed of a magnetic material and disposed on the insulating layer 2; a first read shield gap film 4 which is an insulating film disposed to cover the first read shield layer 3; a magnetoresistive (MR) element 5 serving as a read element disposed on the first read shield gap film 4; a second read shield gap film 6 which is an insulating film disposed on the MR element 5; and a second read shield layer 7 formed of a magnetic material and disposed on the second read shield gap film 6.

An end of the MR element 5 is located in the medium facing surface 80. The MR element 5 may be an element formed of a magneto-sensitive film that exhibits a magnetoresistive effect, such as an anisotropic magnetoresistive (AMR) element, a giant magnetoresistive (GMR) element, or a tunneling magnetoresistive (TMR) element. The GMR element may be of either the current-in-plane (CIP) type in which a current for use in magnetic signal detection is fed in a direction generally parallel to the plane of layers constituting the GMR element or the current-perpendicular-to-plane (CPP) type in which the current for use in magnetic signal detection is fed in a direction generally perpendicular to the plane of the layers constituting the GMR element.

The parts from the first read shield layer 3 to the second read shield layer 7 constitute a read head unit 8. The magnetic head further includes: a nonmagnetic layer 71 formed of a nonmagnetic material and disposed on the second read shield layer 7; a middle shield layer 72 formed of a magnetic material and disposed on the nonmagnetic layer 71; a nonmagnetic layer 73 formed of a nonmagnetic material and disposed on the middle shield layer 72; and a write head unit 9 disposed on the nonmagnetic layer 73. The middle shield layer 72 has the function of shielding the MR element 5 from magnetic fields generated in the write head unit 9. The nonmagnetic layers 71 and 73 are formed of alumina, for example.

The write head unit 9 includes a coil and a main pole 15. The coil produces a magnetic field corresponding to data to be written on the recording medium 90. The coil includes a first coil portion 11 and a second coil portion 12. The first coil portion 11 and the second coil portion 12 are connected in series. The main pole 15 has an end face 15a located in the medium facing surface 80. The main pole 15 passes a magnetic flux corresponding to the magnetic field produced by the coil, and produces a write magnetic field for use to write data on the recording medium 90 by means of a perpendicular magnetic recording system. FIG. 2 shows a cross section that intersects the end face 15a of the main pole 15 and that is perpendicular to the medium facing surface 80 and to the top surface 1a of the substrate 1. Such a cross section will hereinafter be referred to as the main cross section.

The coil includes a winding for forming the first and second coil portions 11 and 12. The winding is formed of a conductive material such as copper. The winding will be described in detail later.

The write head unit 9 further includes a return path section R formed of a magnetic material. The return path section R is connected to the main pole 15, and passes a magnetic flux corresponding to the magnetic field produced by the coil. In the present embodiment, the return path section R includes a first yoke section 31, a second yoke section 42, a first coupling section 32, and a second coupling section 41. The first yoke section 31 lies at a different location from the main pole 15 in the direction T of travel of the recording medium 90. The second yoke section 42 is located on a side of the main pole 15 opposite from the first yoke section 31. In the present embodiment, the first yoke section 31 is located on the leading side, i.e., the rear side in the direction T of travel of the recording medium 90, relative to the main pole 15. The second yoke section 42 is located on the trailing side, i.e., the front side in the direction T of travel of the recording medium 90, relative to the main pole 15.

The first coupling section 32 is located away from the medium facing surface 80 and couples the first yoke section 31 to the main pole 15. The second coupling section 41 is located away from the medium facing surface 80 and couples the second yoke section 42 to the main pole 15.

The return path section R further includes a top shield 16A, a bottom shield 16B, and two side shields 16C and 16D. The top shield 16A is located on the trailing side, i.e., the front side in the direction T of travel of the recording medium 90, relative to the main pole 15. The bottom shield 16B is located on the leading side, i.e., the rear side in the direction T of travel of the recording medium 90, relative to the main pole 15. The two side shields 16C and 16D are located on opposite sides of the main pole 15 in the track width direction TW and magnetically couple the top shield 16A and the bottom shield 16B to each other.

As shown in FIG. 2 and FIG. 3, the top shield 16A has a top surface, a bottom surface, and an end face 16Aa. The end face 16Aa is located in the medium facing surface 80 at a position on the front side in the direction T of travel of the recording medium 90 relative to the end face 15a of the main pole 15. The distance from the top surface 1a of the substrate 1 to any point on the bottom surface of the top shield 16A increases with increasing distance between the point and the medium facing surface 80. As shown in FIG. 3, the bottom shield 16B has an end face 16Ba located in the medium facing surface 80 at a position on the rear side in the direction T of travel of the recording medium 90 relative to the end face 15a of the main pole 15. The two side shields 16C and 16D have two end faces 16Ca and 16Da located in the medium facing surface 80 at positions on opposite sides of the end face 15a of the main pole 15 in the track width direction TW. The end faces 16Aa, 16Ba, 16Ca, and 16Da are arranged to surround the end face 15a of the main pole 15.

The return path section R further includes a third coupling section 33 located near the medium facing surface 80 and coupling the first yoke section 31 to the bottom shield 16B. The first yoke section 31 lies on the nonmagnetic layer 73. Both the first and third coupling sections 32 and 33 lie on the first yoke section 31. The first coupling section 32 includes a first layer 32A lying on the first yoke section 31 and a second layer 32B lying on the first layer 32A. The first yoke section 31 has an end face facing toward the medium facing surface 80 and located at a distance from the medium facing surface 80. The third coupling section 33 has an end face located in the medium facing surface 80.

As shown in FIG. 4, the first coil portion 11 is wound around the first layer 32A of the first coupling section 32. The write head unit 9 further includes: an insulating layer 51 formed of an insulating material, lying on the nonmagnetic layer 73 and surrounding the first yoke section 31; an insulating film 52 formed of an insulating material and isolating the first coil portion 11 from the first yoke section 31, the first layer 32A and the third coupling section 33; and a non-illustrated insulating layer formed of an insulating material and disposed around the first coil portion 11 and the third coupling section 33. The top surfaces of the first coil portion 11, the first layer 32A, the third coupling section 33, the insulating film 52 and the non-illustrated insulating layer are even with each other. The insulating layer 51, the insulating film 52 and the non-illustrated insulating layer are formed of alumina, for example.

The bottom shield 16B lies on the third coupling section 33. The write head unit 9 further includes an insulating layer 53 formed of an insulating material, and a nonmagnetic layer 54 formed of a nonmagnetic material. The insulating layer 53 lies over the top surfaces of the first coil portion 11, the insulating film 52 and the non-illustrated insulating layer, and a portion of the top surface of the third coupling section 33. The nonmagnetic layer 54 lies on the insulating layer 53 and surrounds the bottom shield 16B and the second layer 32B of the first coupling section 32. The insulating layer 53 and the nonmagnetic layer 54 are formed of alumina, for example.

The side shields 16C and 16D are disposed on the bottom shield 16B. The main pole 15 has: the end face 15a; a bottom surface 15L (see FIG. 2) located at the leading-side end, i.e., the rear-side end in the direction T of travel of the recording medium 90; a top surface 15T (see FIG. 2) located at the trailing-side end, i.e., the front-side end in the direction T of travel of the recording medium 90; and a first side surface S1 and a second side surface S2 (see FIG. 5) located at opposite ends in the track width direction TW. The side shield 16C has a first sidewall opposed to a first portion of the first side surface S1 of the main pole 15, the first portion being located near the medium facing surface 80. The side shield 16D has a second sidewall opposed to a first portion of the second side surface S2 of the main pole 15, the first portion being located near the medium facing surface 80.

The write head unit 9 further includes a first gap layer 18 formed of a nonmagnetic material. The first gap layer 18 is disposed to extend along the first and second sidewalls of the side shields 16C and 16D, the top surface of the bottom shield 16B and the top surface of the nonmagnetic layer 54. The nonmagnetic material used to form the first gap layer 18 may be an insulating material or a nonmagnetic metal material. Alumina is an example of an insulating material that can be used to form the first gap layer 18. Ru is an example of a nonmagnetic metal material that can be used to form the first gap layer 18.

A portion of the main pole 15 lies above the top surfaces of the bottom shield 16B and the nonmagnetic layer 54. The first gap layer 18 is interposed between the portion of the main pole 15 and the top surfaces of the bottom shield 16B and the nonmagnetic layer 54. As shown in FIG. 3, the first gap layer 18 is interposed also between the first side surface S1 of the main pole 15 and the first sidewall of the side shield 16C, and between the second side surface S2 of the main pole 15 and the second sidewall of the side shield 16D.

At a location apart from the medium facing surface 80, the bottom surface 15L of the main pole 15 is in contact with the top surface of the second layer 32B of the first coupling section 32. The main pole 15 is formed of a magnetic metal material. The material employed for the main pole 15 may be NiFe, CoNiFe, or CoFe, for example.

The write head unit 9 further includes a nonmagnetic metal layer 58 formed of a nonmagnetic metal material, and an insulating layer 59 formed of an insulating material. The nonmagnetic metal layer 58 lies on a first portion of the top surface 15T of the main pole 15, the first portion being located away from the medium facing surface 80. The insulating layer 59 lies on the top surface of the nonmagnetic metal layer 58. The nonmagnetic metal layer 58 is formed of Ru, NiCr, or NiCu, for example. The insulating layer 59 is formed of alumina, for example.

The write head unit 9 further includes a second gap layer 19. The second gap layer 19 is disposed to cover the nonmagnetic metal layer 58, the insulating layer 59 and part of the top surface 15T of the main pole 15. The second gap layer 19 has an end located in the medium facing surface 80. The second gap layer 19 may be formed of an insulating material such as alumina, or a nonmagnetic conductive material such as Ru, NiCu, Ta, W, NiB, or NiP. FIG. 2 illustrates an example in which the second gap layer 19 is formed of an insulating material, in particular.

The second gap layer 19 may cover a second portion of the first side surface S1 and a second portion of the second side surface S2. The second portion of the first side surface S1 is located farther from the medium facing surface 80 than is the first portion of the first side surface S1. The second portion of the second side surface S2 is located farther from the medium facing surface 80 than is the first portion of the second side surface S2.

The top shield 16A lies on the side shields 16C and 16D and the second gap layer 19. In the medium facing surface 80, a portion of the end face 16Aa of the top shield 16A is spaced from the end face 15a of the main pole 15 by a predetermined distance created by the thickness of the second gap layer 19. The thickness of the second gap layer 19 is preferably in the range of 5 to 60 nm, and more preferably in the range of 10 to 20 nm.

The second coupling section 41 lies on a second portion of the top surface 15T of the main pole 15, the second portion being located away from the medium facing surface 80. The second portion of the top surface 15T of the main pole 15 is located farther from the medium facing surface 80 than is the first portion of the top surface 15T of the main pole 15.

As shown in FIG. 2, the second coil portion 12 is wound around the main pole 15. The write head unit 9 further includes insulating films 63 and 64 each formed of an insulating material. The insulating film 63 is interposed between the second coil portion 12 and the second gap layer 19, between the second coil portion 12 and the top shield 16A, and between the second coil portion 12 and the second coupling section 41. The insulating film 64 covers the second coil portion 12 and the insulating film 63. For example, the insulating films 63 and 64 are formed of alumina.

The write head unit 9 further includes a non-illustrated nonmagnetic layer formed of a nonmagnetic material and disposed around the second coil portion 12, the main pole 15, the top shield 16A, the side shields 16C and 16D, and the second coupling section 41. The non-illustrated nonmagnetic layer is formed of alumina, for example.

The second yoke section 42 lies on the top shield 16A, the second coupling section 41 and the insulating film 64, and connects the top shield 16A and the second coupling section 41. The second yoke section 42 has an end face facing toward the medium facing surface 80 and located at a distance from the medium facing surface 80. The distance from the medium facing surface 80 to any point on the end face of the second yoke section 42 increases with increasing distance between the point and the top surface 1a of the substrate 1.

The write head unit 9 further includes a nonmagnetic layer 65 formed of a nonmagnetic material and disposed around the second yoke section 42. The nonmagnetic layer 65 is formed of alumina, for example.

As shown in FIG. 2 and FIG. 3, the magnetic head further includes a protective layer 70 formed of a nonmagnetic material and disposed to cover the write head unit 9. The protective layer 70 is formed of, for example, an inorganic insulating material such as alumina.

As has been described, the magnetic head according to the present embodiment includes the medium facing surface 80, the read head unit 8, and the write head unit 9. The read head unit 8 and the write head unit 9 are stacked on the substrate 1. The write head unit 9 is located on the front side in the direction T of travel of the recording medium 90 relative to the read head unit 8.

The write head unit 9 includes the coil including the first and second coil portions 11 and 12, the main pole 15, and the return path section R. The return path section R includes the first yoke section 31, the second yoke section 32, the first coupling section 32, the second coupling section 41, the third coupling section 33, the top shield 16A, the bottom shield 16B, and the two side shields 16C and 16D.

The shields 16A, 16B, 16C and 16D capture a disturbance magnetic field applied to the magnetic head from the outside thereof. This makes it possible to prevent the disturbance magnetic field from being intensively captured into the main pole 15 and thereby causing erroneous writing on the recording medium 90. The shields 16A, 16B, 16C and 16D also have the function of capturing a magnetic flux that is produced from the end face 15a of the main pole 15 and spreads in directions other than the direction perpendicular to the plane of the recording medium 90, and thereby preventing the magnetic flux from reaching the recording medium 90.

The return path section R have the function of allowing a magnetic flux that has been produced from the end face 15a of the main pole 15 and has magnetized a portion of the recording medium 90 to flow back. In the present embodiment, the return path section R includes a first magnetic path portion and a second magnetic path portion. The first magnetic path portion is constituted by the bottom shield 16B, the third coupling section 33, the first yoke section 31 and the first coupling section 32. The second magnetic path portion is constituted by the top shield 16A, the second yoke section 42 and the second coupling section 41. A magnetic flux that has been produced from the end face 15a of the main pole 15 and has magnetized a portion of the recording medium 90 is divided to flow through the first magnetic path portion and the second magnetic path portion, and then returns to the main pole 15.

The first magnetic path portion is located on the leading side, i.e., the rear side in the direction T of travel of the recording medium 90 relative to the main pole 15, and is connected to the main pole 15 so that a first space SP1 is defined by the main pole 15 and the first magnetic path portion. The first space SP1 is a space between the main pole 15 and the first yoke section 31 and also between the first coupling section 32 and each of the bottom shield 16B and the third coupling section 33. The second magnetic path portion is located on the trailing side, i.e., the front side in the direction T of travel of the recording medium 90 relative to the main pole 15, and is connected to the main pole 15 so that a second space SP2 is defined by the main pole 15 and the second magnetic path portion. The second space SP2 is a space between the main pole 15 and the second yoke section 42 and also between the top shield 16A and the second coupling section 41. The first coil portion 11 of the coil passes through the first space SP1 only. The second coil portion 12 of the coil passes through both of the first space SP1 and the second space SP2.

The shape of the main pole 15 will now be described in detail with reference to FIG. 2 and FIG. 5. As shown in FIG. 5, the main pole 15 includes a track width defining portion 15A and a wide portion 15B. The track width defining portion 15A has the end face 15a and an end opposite to the end face 15a. The wide portion 15B is connected to the end of the track width defining portion 15A. As shown in FIG. 2 and FIG. 5, the main pole 15 has the bottom surface 15L, the top surface 15T, the first side surface S1 and the second side surface S2. The width of the top surface 15T in the track width direction TW is greater in the wide portion 15B than in the track width defining portion 15A.

In the track width defining portion 15A, the width of the top surface 15T in the track width direction TW is generally constant regardless of distance from the medium facing surface 80. In the wide portion 15B, the width of the top surface 15T in the track width direction TW is, for example, equal to that in the track width defining portion 15A at the boundary between the track width defining portion 15A and the wide portion 15B, and gradually increases with increasing distance from the medium facing surface 80, then becoming constant. The length of the track width defining portion 15A in a direction perpendicular to the medium facing surface 80 will be referred to as the neck height. The neck height falls within the range of 0 to 0.3 µm, for example. A zero neck height means that the track width defining portion 15A is not present and the wide portion 15B thus has the end face 15a.

As shown in FIG. 2, the top surface 15T includes an inclined portion 15T1 and a flat portion 15T2, the inclined portion 15T1 being located closer to the medium facing surface 80 than the flat portion 15T2. The inclined portion 15T1 has a first end located in the medium facing surface 80 and a second end opposite to the first end. The flat portion 15T2 is connected to the second end of the inclined portion 15T1. The inclined portion 15T1 is inclined with respect to the medium facing surface 80 and the direction perpendicular to the medium facing surface 80 such that its second end is located on the front side in the direction T of travel of the recording medium 90 relative to its first end. The flat portion 15T2 extends substantially perpendicularly to the medium facing surface 80.

The bottom surface 15L includes an inclined portion and a flat portion, the inclined portion being located closer to the medium facing surface 80 than the flat portion. The inclined portion of the bottom surface 15L has a first end located in the medium facing surface 80 and a second end opposite to the first end. The flat portion of the bottom surface 15L is connected to the second end of the inclined portion of the bottom surface 15L. The inclined portion of the bottom surface 15L is inclined with respect to the medium facing surface 80 and the direction perpendicular to the medium facing surface 80 such that its second end is located on the rear side in the direction T of travel of the recording medium 90 relative to its first end. The flat portion of the bottom surface 15L extends substantially perpendicularly to the medium facing surface 80.

The end face 15a of the main pole 15 has a first side in contact with the second gap layer 19, a second side connected to one end of the first side, and a third side connected to the other end of the first side. The first side defines the track width. The position of an end of a record bit to be recorded on the recording medium 90 is determined by the position of the first side. The width of the end face 15a of the main pole 15 in the track width direction TW decreases with increasing distance from the first side, that is, with decreasing distance to the top surface 1a of the substrate 1. Each of the second side and the third side forms an angle of, for example, 7° to 17°, or preferably 10° to 15°, with respect to a direction perpendicular to the top surface 1a of the substrate 1. The first side has a length in the range of 0.05 to 0.20 µm, for example.

Figure 1:
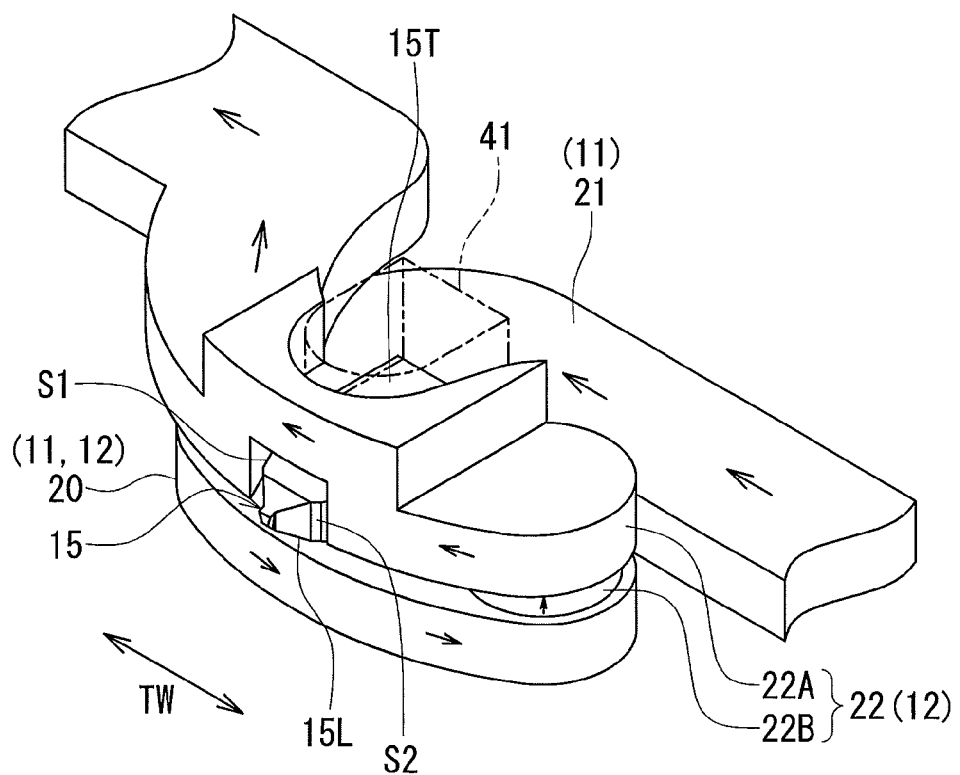
FIG. 1 is a perspective view showing the main part of a magnetic head according to a first embodiment of the invention.

Now, the coil will be described in detail with reference to FIG. 1, FIG. 2, and FIG. 4 to FIG. 6. FIG. 1 is a perspective view showing the main part of the magnetic head according to the present embodiment. As described previously, the coil includes a winding for forming the first and second coil portions 11 and 12. The winding includes a common portion 20, a first dedicated portion 21, and a second dedicated portion 22. The common portion 20 is used in common to form part of the first coil portion 11 and part of the second coil portion 12. The first dedicated portion 21 is connected to the common portion 20, and is used to form the remainder of the first coil portion 11. The second dedicated portion 22 is connected to the common portion 20, and is used to form the remainder of the second coil portion 12. In FIG. 4 the boundary between the common portion 20 and the first dedicated portion 21 is shown by a dotted line.

As shown in FIG. 2 and FIG. 4, the first coupling section 32 has a top surface in contact with the main pole 15, a bottom surface in contact with the first yoke section 31, and an outer peripheral surface 32S connecting the top surface and the bottom surface. The outer peripheral surface 32S is in contact with neither of the main pole 15 and the first yoke section 31. The first coil portion 11 surrounds at least part of the outer peripheral surface 32S of the first coupling section 32. In the present embodiment, in particular, the first coil portion 11 is of one turn or less. In the example shown in FIG. 4, the first coil portion 11 extends approximately once around the first coupling section 32. Thus, the first coil portion 11 is of substantially one turn. The common portion 20 is formed only of a single coil element extending to pass through the first space SP1. The term "coil element" refers to part of the winding of the coil. The first dedicated portion 21 is coplanar with the common portion 20. The common portion 20 has a connection 20E located near an end of the common portion 20 opposite from the boundary between the common portion 20 and the first dedicated portion 21.

The second coil portion 12 surrounds at least part of the entire perimeter of the main pole 15 as viewed from the medium facing surface 80. In the present embodiment, in particular, the second coil portion 12 is of one turn or less. In the example shown in FIG. 1, the second coil portion 12 extends approximately once around the main pole 15. Thus, the second coil portion 12 is of substantially one turn. The second dedicated portion 22 is located on the front side in the direction T of travel of the recording medium 90 relative to the common portion 20. Part of the main pole 15 is interposed between the common portion 20 and the second dedicated portion 22.

As shown in FIG. 1, FIG. 5 and FIG. 6, the second dedicated portion 22 includes a coil element 22A as a principal component, and a connection layer 22B connecting the common portion 20 and the coil element 22A. The coil element 22A extends to pass through the second space SP2. The coil element 22A extends along the top surface 15T and the first and second side surfaces S1 and S2 of the main pole 15 without contacting them. The connection layer 22B has a bottom surface in contact with the connection 20E of the common portion 20, and a top surface in contact with the bottom surface of the coil element 22A. In the present embodiment, the first dedicated portion 21, the common portion 20 and the second dedicated portion 22 are connected in series in this order. In FIG. 1, FIG. 4 and FIG. 6, the arrows in the common portion 20 and the dedicated portions 21 and 22 indicate the direction of current flowing through the coil at some point in time.

Now, functions and effects specific to the magnetic head according to the present embodiment will be described. In the present embodiment, the first coil portion 11 of the coil is wound around the first coupling section 32, which is part of the return path section R, and not around the main pole 15. The second coil portion 12 of the coil is wound around the main pole 15. The winding of the coil includes: the common portion 20 used in common to form part of the first coil portion 11 and part of the second coil portion 12; the first dedicated portion 21 used to form the remainder of the first coil portion 11; and the second dedicated portion 22 used to form the remainder of the second coil portion 12. A magnetic path constituted by the first magnetic path portion and the main pole 15 defines the first space SP1 through which the common portion 20 passes. The present embodiment makes it possible to make the first space SP1 smaller and accordingly make the magnetic path constituted by the first magnetic path portion and the main pole 15 shorter when compared with the case where the first coil portion 11 and the second coil portion 12 are formed as completely separate portions. The present embodiment thus allows increase in frequency of write signals, and consequently allows increase in recording density.

In the present embodiment, in particular, each of the first coil portion 11 and the second coil portion 12 is of one turn or less, and the common portion 20 passing through the space SP1 is formed only of a single coil element. This allows the first space SP1 to be even smaller, and thus allows the magnetic path constituted by the first magnetic path portion and the main pole 15 to be even shorter.

Further, according to the present embodiment, since the coil includes the first coil portion 11 and the second coil portion 12, it is possible to sufficiently increase the magnetomotive force of the coil when compared with the case where the coil is provided with only either one of the first coil portion 11 and the second coil portion 12.

Further, in the present embodiment, the coil element 22A of the second dedicated portion 22 extends along the top surface 15T and the first and second side surfaces S1 and S2 of the main pole 15. This makes it possible for the second coil portion 12 to supply a larger magnetomotive force to the main pole 15 when compared with the case where the second dedicated portion 22 does not extend along the first and second side surfaces S1 and S2. To make the magnetomotive force larger, the second dedicated portion 22 is preferably located at a somewhat small distance from each of the top surface 15T and the first and second side surfaces S1 and S2 of the main pole 15. Specifically, the distance is preferably in the range of 20 nm to 2 µm.

In the present embodiment, the top surface 15T of the main pole 15 includes the inclined portion 15T1, and the bottom surface 15L of the main pole 15 includes the inclined portion mentioned previously. This configuration allows the thickness of a portion of the main pole 15 near the medium facing surface 80 to decrease toward the medium facing surface 80, thus making it possible to prevent the occurrence of adjacent track erasure (ATE) or wide-area track erasure (WATE) induced by a skew. On the other hand, since a portion of the main pole 15 located away from the medium facing surface 80 can have a large thickness, it is possible for the main pole 15 to guide much magnetic flux to the medium facing surface 80. This allows improvement of write characteristics such as overwrite property.

A manufacturing method for the magnetic head according to the present embodiment will now be described. According to the manufacturing method, first, as shown in FIG. 2 and FIG. 3, the insulating layer 2, the first read shield layer 3 and the first read shield gap film 4 are formed in this order into a stack on the substrate 1. Then, the MR element 5 and leads (not illustrated) connected to the MR element 5 are formed on the first read shield gap film 4. The MR element 5 and the leads are then covered with the second read shield gap film 6. Next, the second read shield layer 7, the nonmagnetic layer 71, the middle shield layer 72 and the nonmagnetic layer 73 are formed in this order into a stack on the second read shield gap film 6.

Reference is now made to FIG. 7A to FIG. 12B to describe a series of steps to be performed after the foregoing step up to the formation of the nonmagnetic layer 65. FIG. 7A to FIG. 12B each illustrate a stack of layers formed in the process of manufacturing the magnetic head. Fig. nA (n is an integer between 7 and 12 inclusive) shows a cross section perpendicular to the medium facing surface 80 and to the top surface 1a of the substrate 1, particularly the main cross section. Fig. nB shows a cross section of the stack taken at the location at which the medium facing surface 80 is to be formed. The symbol "ABS" in Fig. nA indicates the location at which the medium facing surface 80 is to be formed. Fig. nA and Fig. nB omit the illustration of portions located below the first yoke section 31 and the insulating layer 51. FIGS. 9C and 10C are partial perspective views of the stack.

Figure 7A:
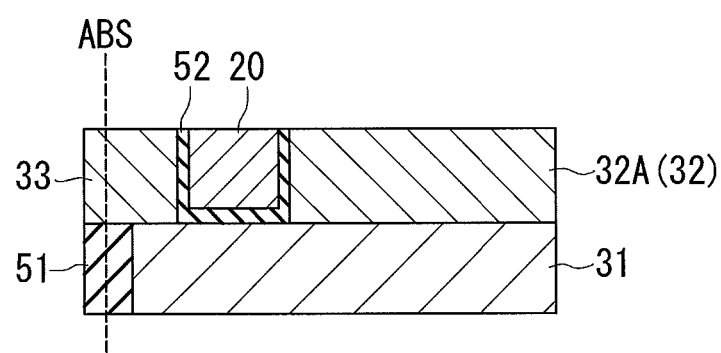
FIG. 7A and FIG. 7B are cross-sectional views showing a step of a manufacturing method for the magnetic head according to the first embodiment of the invention.
Figure 7B:
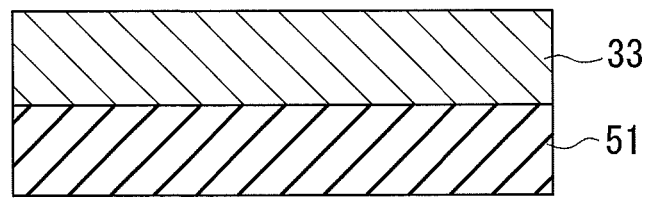

In the step shown in FIG. 7A and FIG. 7B, first, the first yoke section 31 is formed on the nonmagnetic layer 73 by frame plating, for example. Then, the insulating layer 51 is formed over the entire top surface of the stack. The insulating layer 51 is then polished by, for example, chemical mechanical polishing (hereinafter, "CMP"), until the first yoke section 31 is exposed. Next, the first layer 32A of the first coupling section 32 and the third coupling section 33 are formed on the first yoke section by frame plating, for example. The insulating film 52 is then formed over the entire top surface of the stack. Next, the common portion 20 and the first dedicated portion 21 (see FIG. 4) of the winding are formed by frame plating, for example. The non-illustrated insulating layer is then formed over the entire top surface of the stack. The insulating film 52 and the non-illustrated insulating layer are then polished by, for example, CMP, until the common portion 20, the first dedicated portion 21, the first layer 32A and the third coupling section 33 are exposed.

Figure 8A:
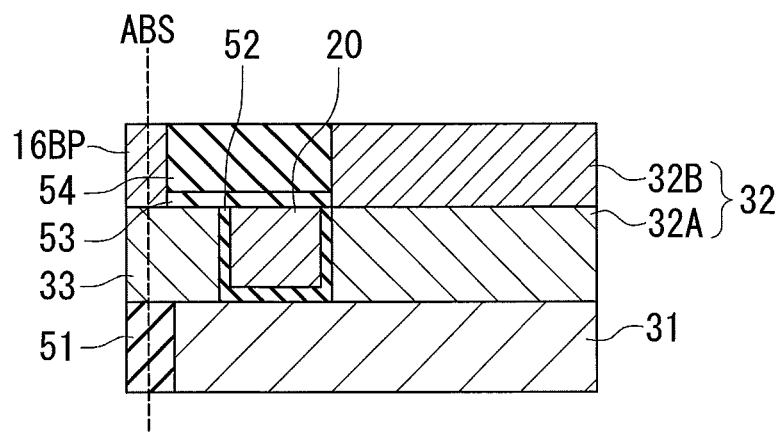
FIG. 8A and FIG. 8B are cross-sectional views showing a step that follows the step shown in FIG. 7A and FIG. 7B.
Figure 8B:
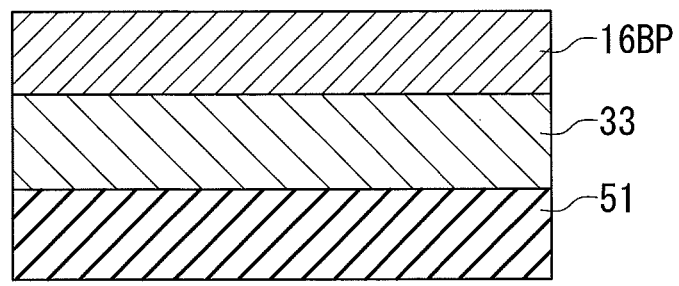

FIG. 8A and FIG. 8B show the next step. In this step, first, the insulating layer 53 is formed over the entire top surface of the stack. The insulating layer 53 is then selectively etched to form therein a first opening for exposing the top surface of the first layer 32A, a second opening for exposing the top surface of the third coupling section 33, and a third opening for exposing the connection 20E (see FIG. 4) of the common portion 20. Then, the second layer 32B of the first coupling section 32 is formed on the first layer 32A at the location of the first opening, an initial bottom shield 16BP to become the bottom shield 16B later is formed on the third coupling section 33 at the location of the second opening, and the connection layer 22B (see FIG. 5 and FIG. 6) of the second dedicated portion 22 is formed on the connection 20E of the common portion 20 at the location of the third opening, by performing frame plating, for example. Next, the nonmagnetic layer 54 is formed over the entire top surface of the stack. The nonmagnetic layer 54 is then polished by, for example, CMP, until the initial bottom shield 16BP, the second layer 32B and the connection layer 22B are exposed.

Figure 9A:
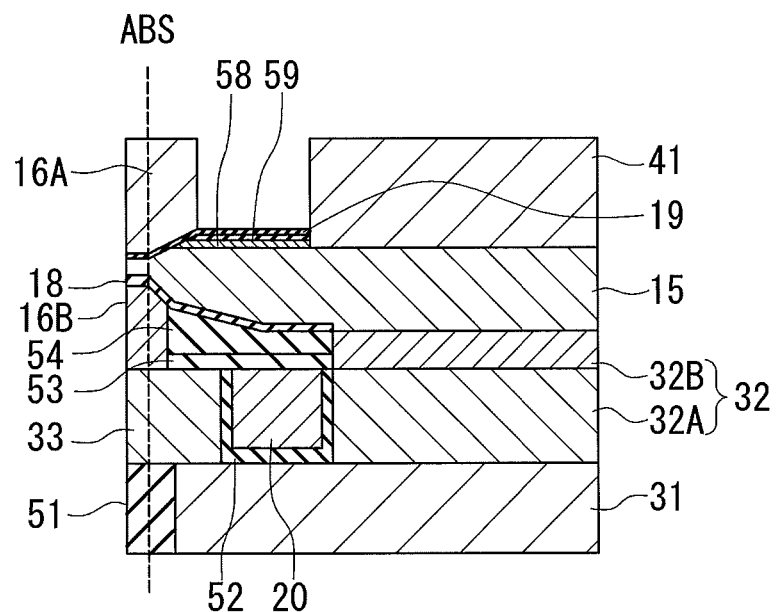
FIG. 9A to FIG. 9C are explanatory diagrams showing a step that follows the step shown in FIG. 8A and FIG. 8B.
Figure 9B:
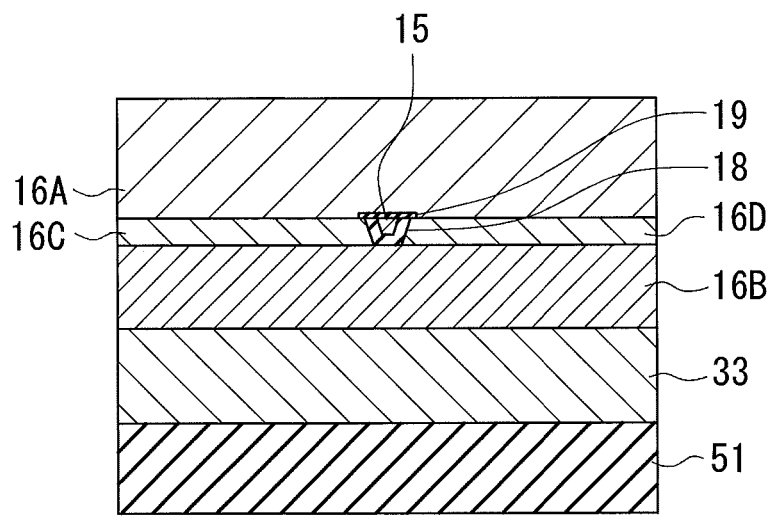
Figure 9C:
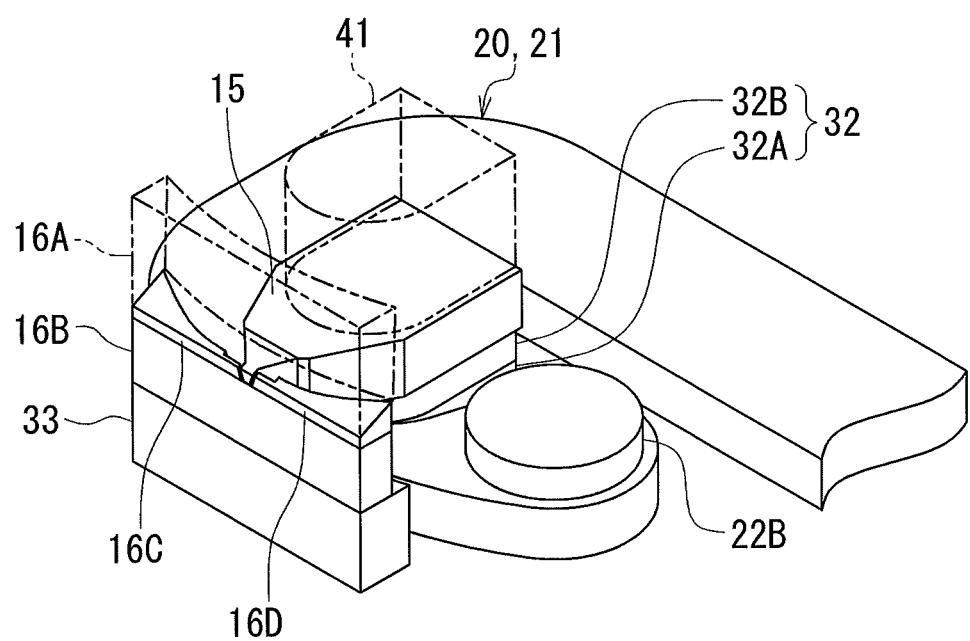

FIG. 9A to FIG. 9C show the next step. In this step, first, the initial bottom shield 16BP and the nonmagnetic layer 54 are taper-etched in part by, for example, ion beam etching (hereinafter, "IBE") so that the top surface of the initial bottom shield 16BP is provided with a portion to be opposed to the inclined portion of the bottom surface 15L of the main pole 15 to be formed later. This makes the initial bottom shield 16BP into the bottom shield 16B. This etching process also etches the second layer 32B and the connection layer 22B in part.

Next, the side shields 16C and 16D are formed on the bottom shield 16B by frame plating, for example. The first gap layer 18 is then formed to cover the bottom shield 16B and the side shields 16C and 16D. Where alumina is selected as the material of the first gap layer 18, the first gap layer 18 is formed by atomic layer deposition, for example. Where Ru is selected as the material of the first gap layer 18, the first gap layer 18 is formed by chemical vapor deposition, for example. Next, the first gap layer 18 is selectively etched to form therein an opening for exposing the top surface of the second layer 32B and an opening for exposing the top surface of the connection layer 22B.

Next, the main pole 15, the nonmagnetic metal layer 58 and the insulating layer 59 are formed in this order. The inclined portion 15T1 of the top surface 15T of the main pole 15 is formed by etching a portion of the main pole 15 by, for example, IBE, after the nonmagnetic metal layer 58 and the insulating layer 59 are formed. This etching process also etches the side shields 16C and 16D in part. Next, the second gap layer 19 is formed to cover the main pole 15, the nonmagnetic metal layer 58 and the insulating layer 59. The second gap layer 19 is then selectively etched by, for example, IBE, so that the second portion of the top surface 15T of the main pole 15 and portions of the top surfaces of the side shields 16C and 16D are exposed. Then, the top shield 16A is formed over the side shields 16C and 16D and the second gap layer 19, and the second coupling section 41 is formed on the main pole 15, by performing frame plating, for example.

Figure 10A:
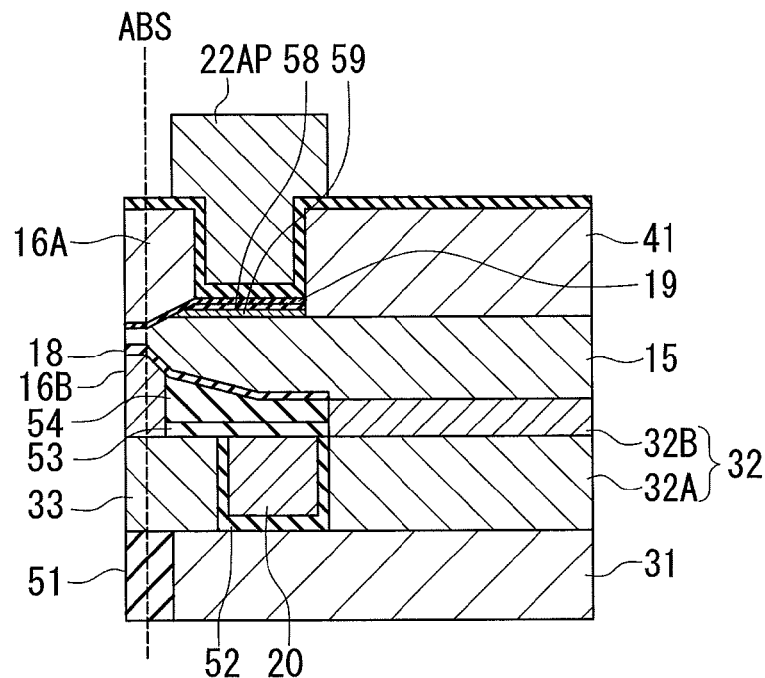
FIG. 10A to FIG. 10C are explanatory diagrams showing a step that follows the step shown in FIG. 9A to FIG. 9C.
Figure 10B:
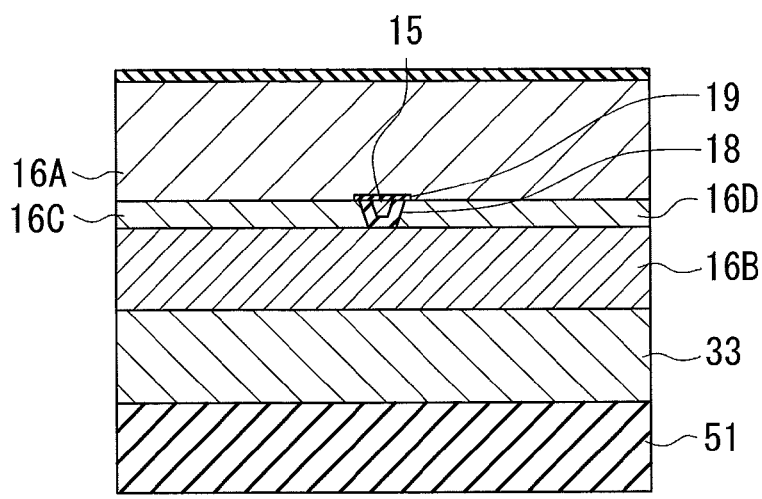
Figure 10C:
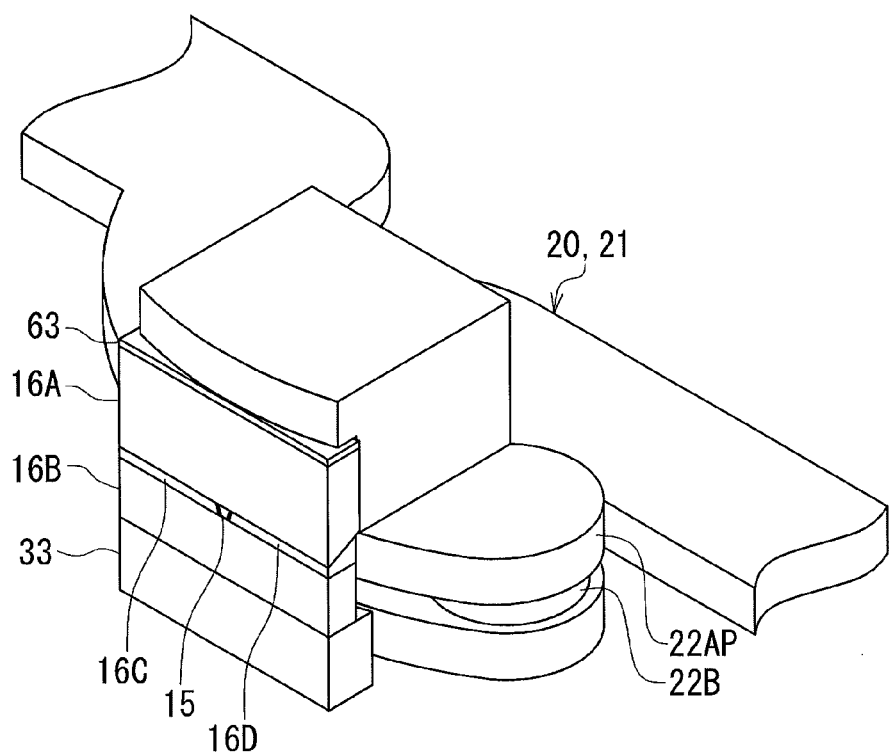

FIG. 10A to FIG. 10C show the next step. In this step, first, the insulating film 63 is formed over the entire top surface of the stack. Then, the second gap layer 19 and the insulating film 63 are selectively etched by, for example, IBE, so that the top surface of the connection layer 22B is exposed. Next, an initial coil element 22AP is formed by frame plating, for example. The initial coil element 22AP will later become the coil element 22A of the second dedicated portion 22. The initial coil element 22AP is formed such that a portion thereof rides over the top shield 16A and the second coupling section 41.

Figure 11A:
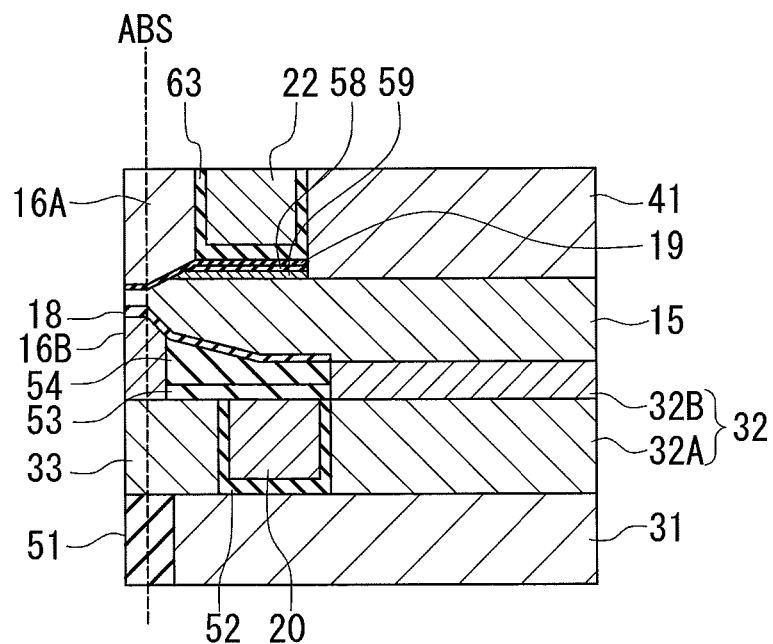
FIG. 11A and FIG. 11B are cross-sectional views showing a step that follows the step shown in FIG. 10A to FIG. 10C.
Figure 11B:
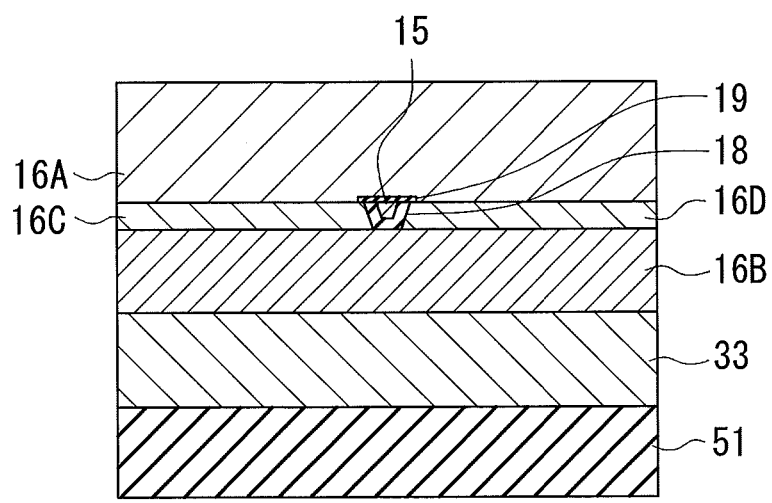

FIG. 11A and FIG. 11B show the next step. In this step, first, the non-illustrated nonmagnetic layer is formed over the entire top surface of the stack. Then, the initial coil element 22AP, the insulating film 63 and the non-illustrated nonmagnetic layer are polished by, for example, CMP, until the top shield 16A and the second coupling section 41 are exposed. This makes the initial coil element 22AP into the coil element 22A, thereby completing the second dedicated portion 22.

Figure 12A:
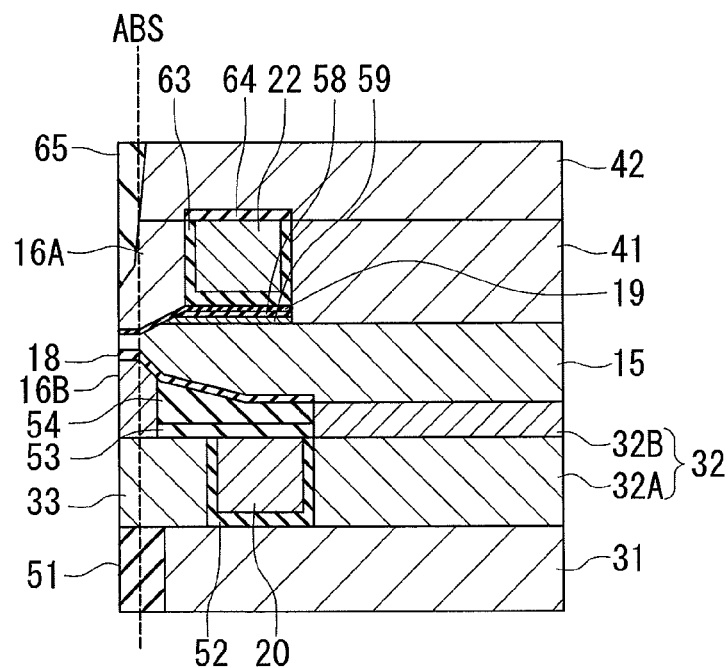
FIG. 12A and FIG. 12B are cross-sectional views showing a step that follows the step shown in FIG. 11A and FIG. 11B.
Figure 12B:
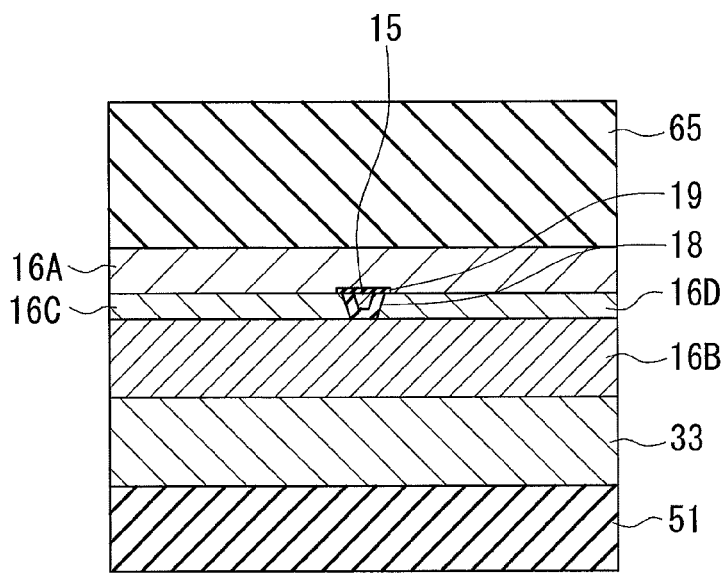

FIG. 12A and FIG. 12B show the next step. In this step, first, the insulating film 64 is formed over the entire top surface of the stack. The insulating film 64 is then selectively etched to form therein two openings for exposing the respective top surfaces of the top shield 16A and the second coupling section 41. Next, the second yoke section 42 is formed over the top shield 16A, the second coupling section 41 and the insulating film 64. The top shield 16A and the second yoke section 42 are then etched by, for example, reactive ion etching or IBE, so as to provide the second yoke section 42 with the end face facing toward the medium facing surface 80. Next, the nonmagnetic layer 65 is formed over the entire top surface of the stack. The nonmagnetic layer 65 is then polished by, for example, CMP, until the second yoke section 42 is exposed.

Steps that follow the step shown in FIG. 12A and FIG. 12B will now be described with reference to FIG. 2 and FIG. 3. First, the protective layer 70 is formed to cover the entire top surface of the stack. Then, wiring, terminals and other components are formed on the protective layer 70, and the substrate 1 is cut near the location at which the medium facing surface 80 is to be formed. The cut surface is then polished to form the medium facing surface 80, and processing such as fabrication of flying rails is performed to complete the magnetic head.

Second Embodiment

Figure 13:
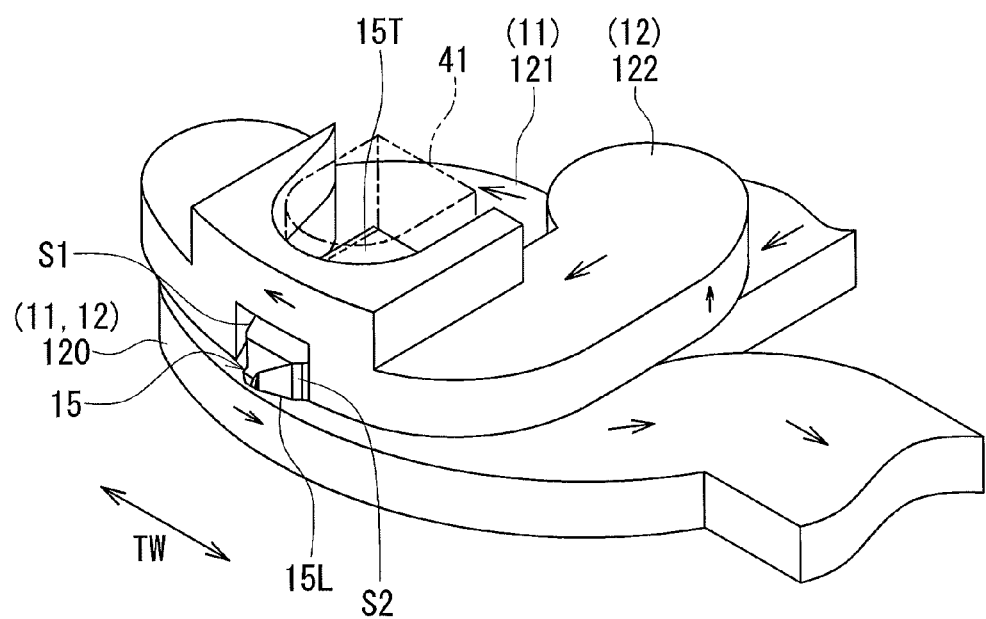
FIG. 13 is a perspective view showing the main part of a magnetic head according to a second embodiment of the invention.
Figure 14:
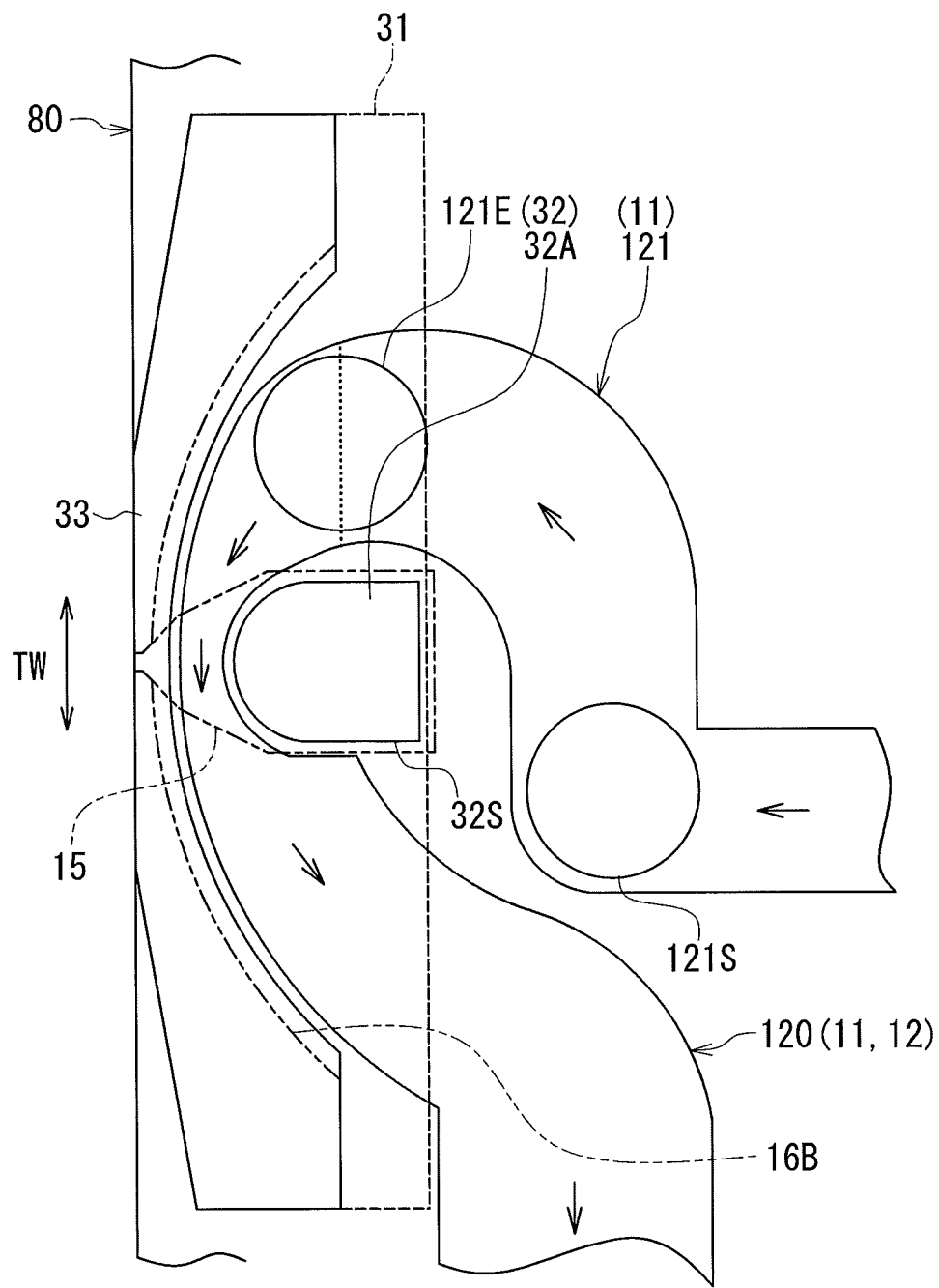
FIG. 14 is a plan view showing a common portion and a first dedicated portion of the winding of the coil of the magnetic head according to the second embodiment of the invention.
Figure 15:
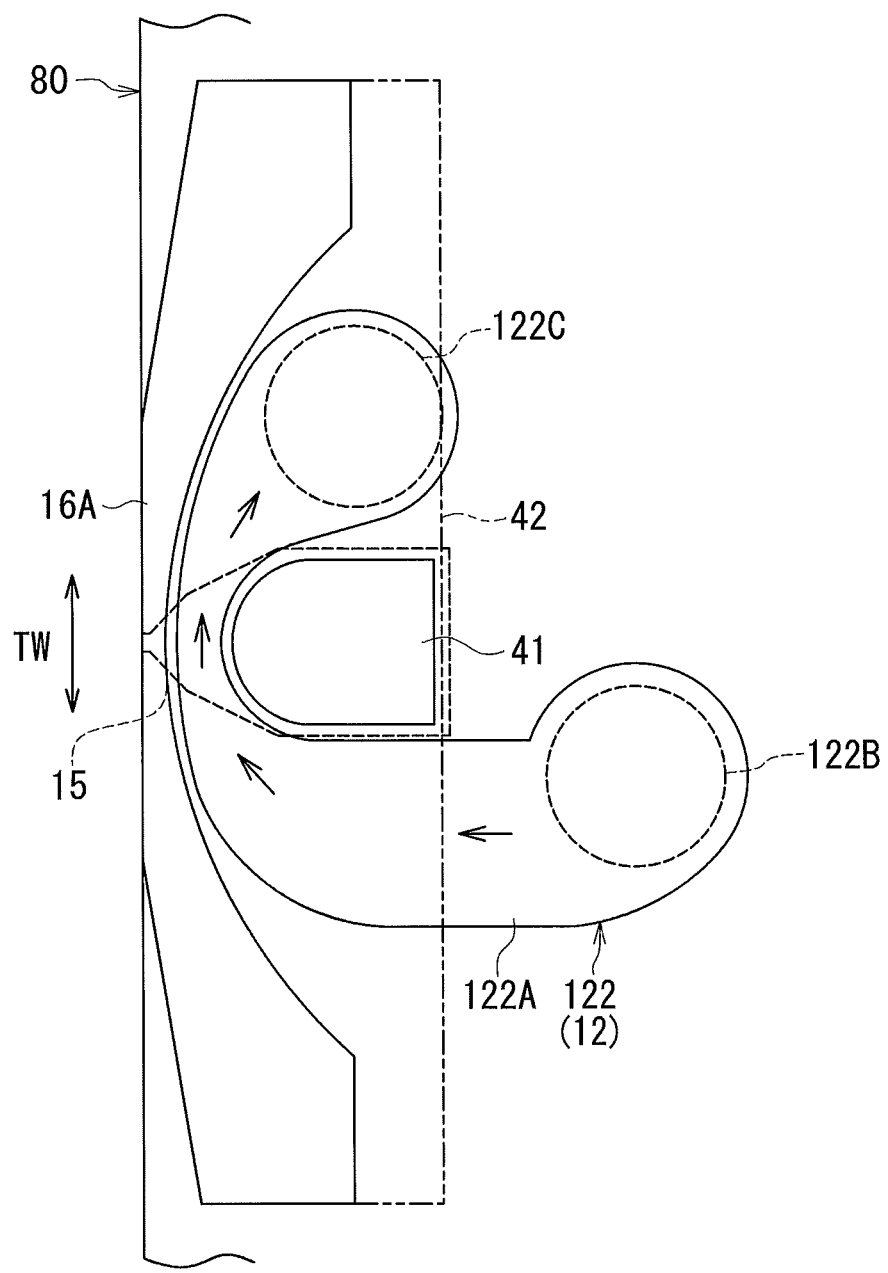
FIG. 15 is a plan view showing a second dedicated portion of the winding of the coil of the magnetic head according to the second embodiment of the invention.

A magnetic head according to a second embodiment of the present invention will now be described with reference to FIG. 13 to FIG. 15. FIG. 13 is a perspective view showing the main part of the magnetic head according to the present embodiment. FIG. 14 is a plan view showing a common portion and a first dedicated portion of the winding of the coil of the magnetic head according to the present embodiment. FIG. 15 is a plan view showing a second dedicated portion of the winding of the coil of the magnetic head according to the present embodiment. In FIG. 13 to FIG. 15, the arrow labeled TW indicates the track width direction.

The magnetic head according to the present embodiment differs from the magnetic head according to the first embodiment in the following ways. The winding of the coil of the present embodiment includes a common portion 120, a first dedicated portion 121 and a second dedicated portion 122, in place of the common portion 20, the first dedicated portion 21 and the second dedicated portion 22 of the first embodiment. The common portion 120 is used in common to form part of the first coil portion 11 of the present embodiment and part of the second coil portion 12 of the present embodiment. The first dedicated portion 121 is connected to the common portion 120, and is used to form the remainder of the first coil portion 11. The second dedicated portion 122 is connected to the common portion 120, and is used to form the remainder of the second coil portion 12. In FIG. 14 the boundary between the common portion 120 and the first dedicated portion 121 is shown by a dotted line.

As shown in FIG. 14, the first dedicated portion 121 has a first connection 121S and a second connection 121E at mutually different locations. The second connection 121E includes the boundary between the first dedicated portion 121 and the common portion 120. The first connection 121S is located away from the boundary between the first dedicated portion 121 and the common portion 120.

As shown in FIG. 13 and FIG. 15, the second dedicated portion 122 includes a coil element 122A as a principal component, and two connection layers 122B and 122C connecting the first dedicated portion 121 and the coil element 122A. The coil element 122A extends along the top surface 15T and the first and second side surfaces S1 and S2 of the main pole 15 without contacting them. The two connection layers 122B and 122C are at mutually different locations. The connection layer 122B corresponds to the third connection in the present invention. The connection layer 122C corresponds to the fourth connection in the present invention.

The first connection 121S and the connection layer 122B (the third connection) are connected to each other. The second connection 121E and the connection layer 122C (the fourth connection) are connected to each other, and connected to the common portion 120. In the present embodiment, the part of the first dedicated portion 121 from the first connection 1221S to the second connection 121E and the part of the second dedicated portion 122 from the connection layer 122B (the third connection) to the connection layer 122C (the fourth connection) are connected in parallel. In FIG. 13 to FIG. 15, the arrows in the common portion 120 and the dedicated portions 121 and 122 indicate the direction of current flowing through the coil at some point in time.

The remainder of configuration, function and effects of the present embodiment are similar to those of the first embodiment.

Third Embodiment

Figure 16:
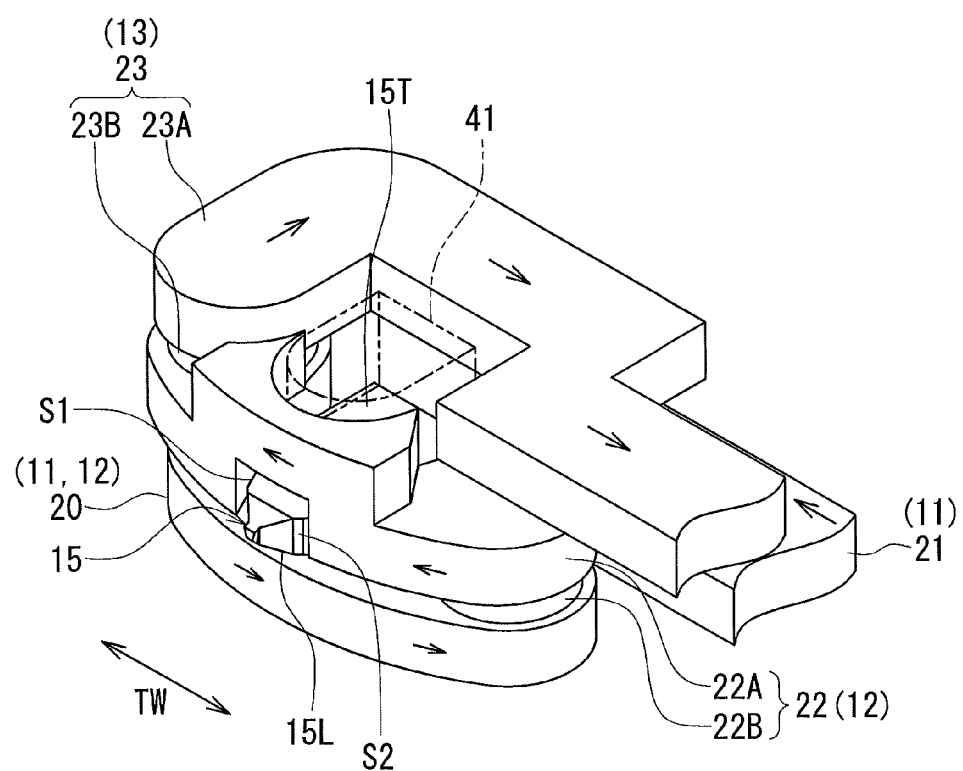
FIG. 16 is a perspective view showing the main part of a magnetic head according to a third embodiment of the invention.
Figure 17:
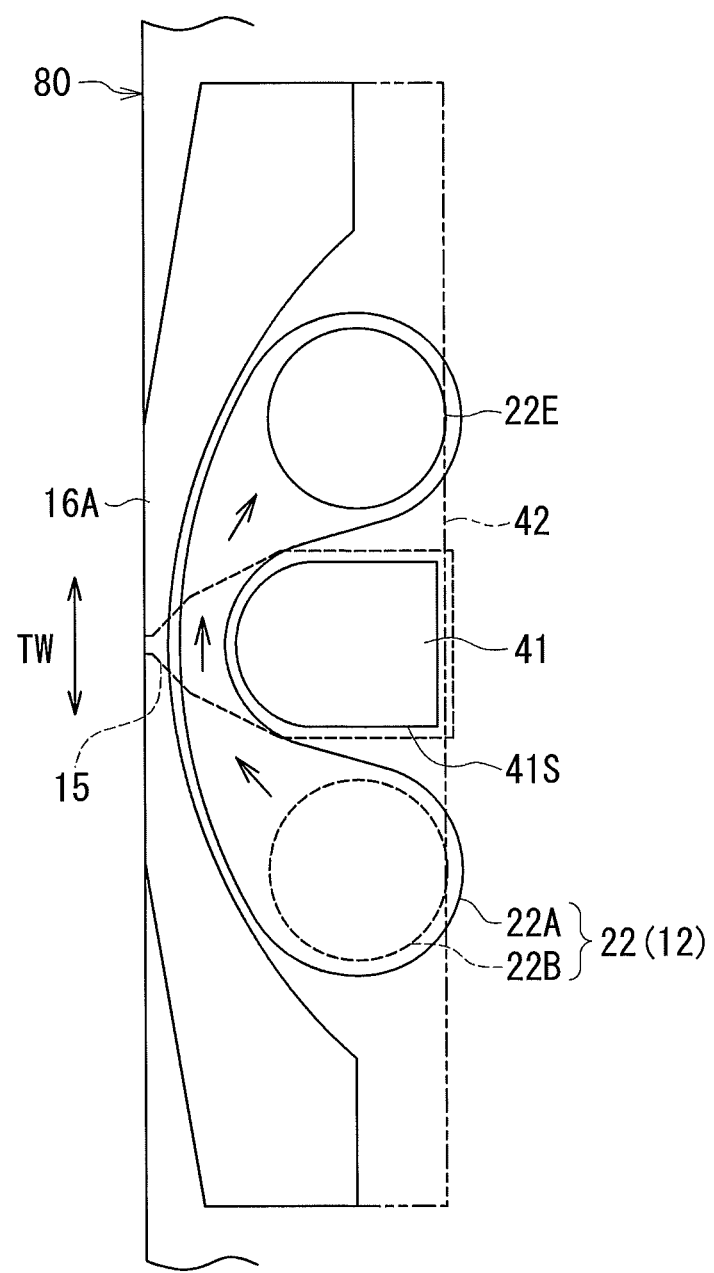
FIG. 17 is a plan view showing a second dedicated portion of the winding of the coil of the magnetic head according to the third embodiment of the invention.
Figure 18:
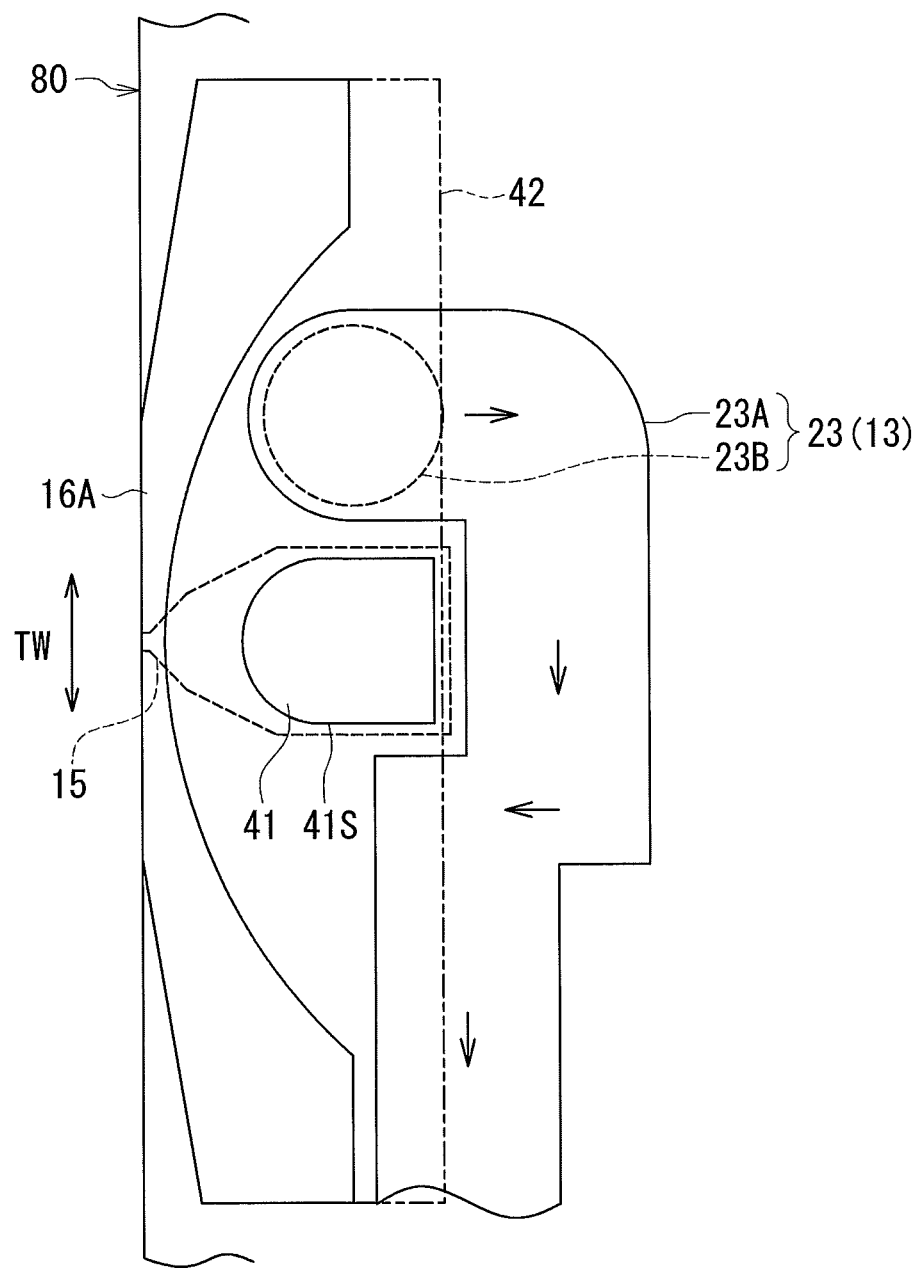
FIG. 18 is a plan view showing a third dedicated portion of the winding of the coil of the magnetic head according to the third embodiment of the invention.

A magnetic head according to a third embodiment of the present invention will now be described with reference to FIG. 16 to FIG. 18. FIG. 16 is a perspective view showing the main part of the magnetic head according to the present embodiment. FIG. 17 is a plan view showing a second dedicated portion of the winding of the coil of the magnetic head according to the present embodiment. FIG. 18 is a plan view showing a third dedicated portion of the winding of the coil of the magnetic head according to the present embodiment. In FIG. 16 to FIG. 18, the arrow labeled TW indicates the track width direction.

The magnetic head according to the present embodiment differs from the magnetic head according to the first embodiment in the following ways. The coil of the present embodiment includes a third coil portion 13 in addition to the first and second coil portions 11 and 12. As shown in FIG. 18, the second coupling section 41 has a top surface in contact with the second yoke section 42, a bottom surface in contact with the main pole 15, and an outer peripheral surface 41S connecting the top surface and the bottom surface. The outer peripheral surface 41S is in contact with neither of the main pole 15 and the second yoke section 42. The third coil portion 13 is located on the front side in the direction T (FIG. 2) of travel of the recording medium 90 relative to part of the second coil portion 12, and surrounds at least part of the outer peripheral surface 41S of the second coupling section 41. In the present embodiment, in particular, the third coil portion 13 is of one turn or less. In the example shown in FIG. 18, the third coil portion 13 extends approximately 0.5 time around the outer peripheral surface 41S of the second coupling section 41. Thus, the third coil portion 13 is of approximately 0.5 turn.

The winding of the coil of the present embodiment includes a third dedicated portion 23 in addition to the common portion 20, the first dedicated portion 21 and the second dedicated portion 22. The third dedicated portion 23 is used to form at least part of the third coil portion 13. The third dedicated portion 23 is connected to the second dedicated portion 22.

In the present embodiment, as shown in FIG. 17, the coil element 22A of the second dedicated portion 22 has a connection 22E. The connection 22E is located near an end of the coil element 22A opposite from the boundary between the coil element 22A and the connection layer 22B. As shown in FIG. 16 and FIG. 18, the third dedicated portion 23 includes a coil element 23A as a principal component, and a connection layer 23B connecting the coil element 22A of the second dedicated portion 22 and the coil element 23A. The connection layer 23B has a bottom surface in contact with the connection 22E of the coil element 22A, and a top surface in contact with the bottom surface of the coil element 23A. In the present embodiment, the first dedicated portion 21, the common portion 20, the second dedicated portion 22, and the third dedicated portion 23 are connected in series in this order. In FIG. 16 to FIG. 18, the arrows in the common portion 20 and the dedicated portions 21, 22 and 23 indicate the direction of current flowing through the coil at some point in time.

According to the present embodiment, since the coil includes the third coil portion 13, it is possible to make the magnetomotive force of the coil larger than in the first embodiment.

The remainder of configuration, function and effects of the present embodiment are similar to those of the first embodiment.

Fourth Embodiment

Figure 19:
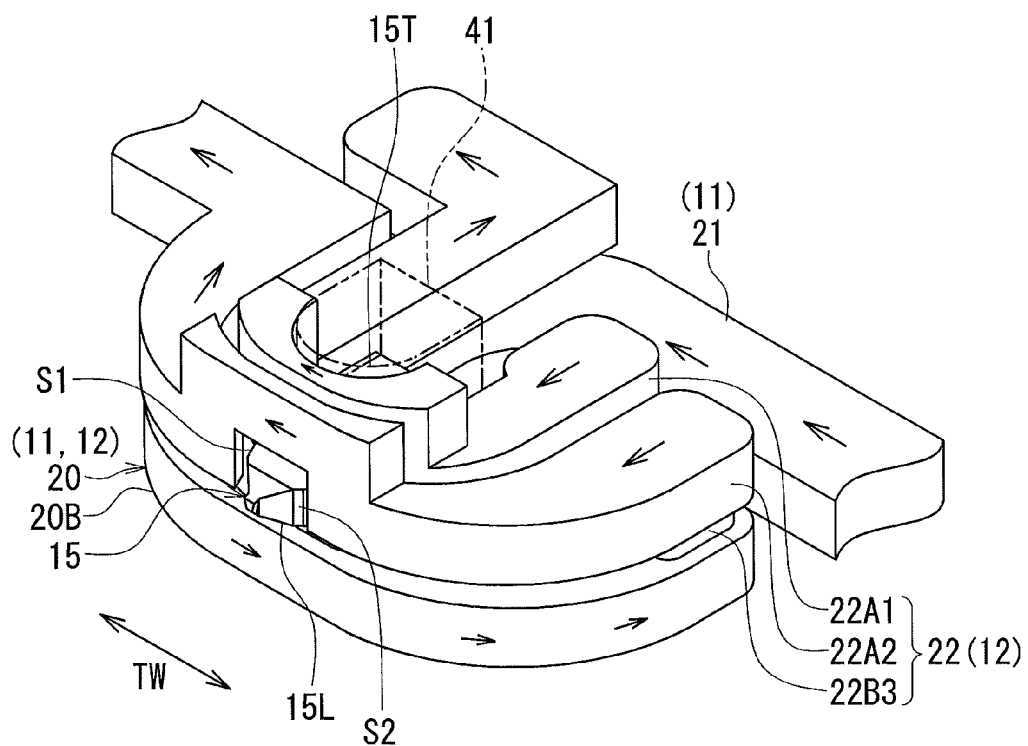
FIG. 19 is a perspective view showing the main part of a magnetic head according to a fourth embodiment of the invention.
Figure 20:
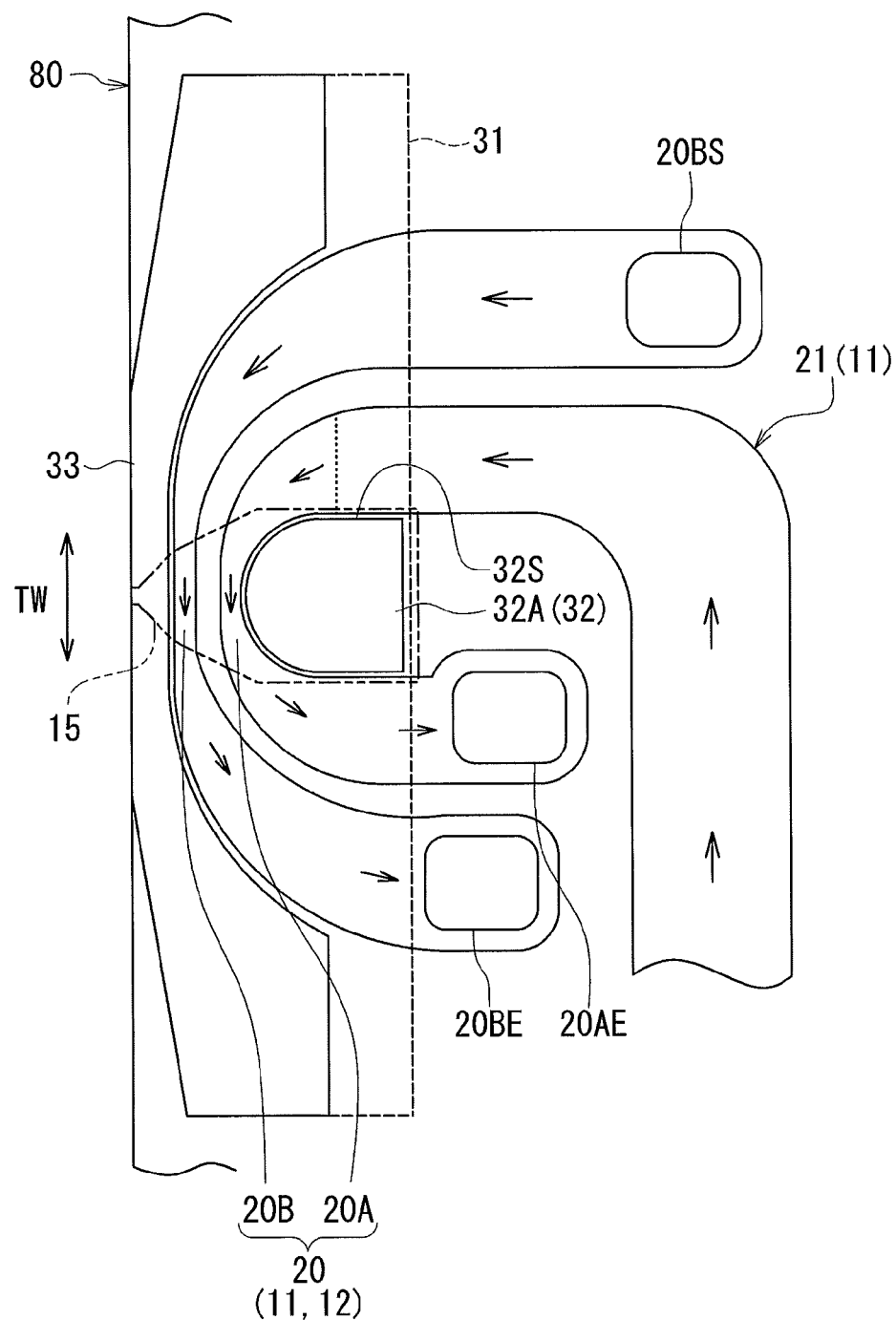
FIG. 20 is a plan view showing a common portion and a first dedicated portion of the winding of the coil of the magnetic head according to the fourth embodiment of the invention.
Figure 21:
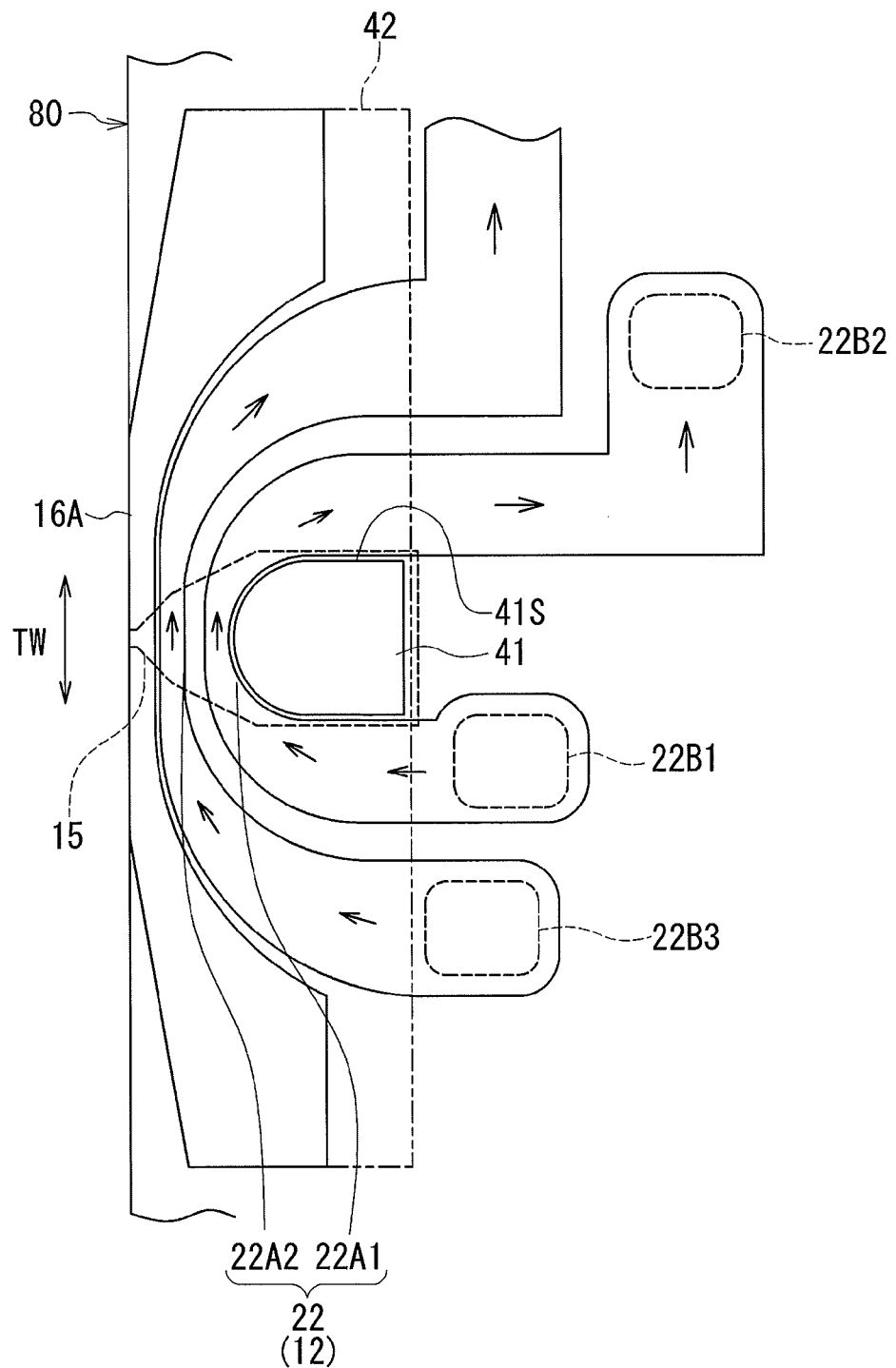
FIG. 21 is a plan view showing a second dedicated portion of the winding of the coil of the magnetic head according to the fourth embodiment of the invention.

A magnetic head according to a fourth embodiment of the present invention will now be described with reference to FIG. 19 to FIG. 21. FIG. 19 is a perspective view showing the main part of the magnetic head according to the present embodiment. FIG. 20 is a plan view showing a common portion and a first dedicated portion of the winding of the coil of the magnetic head according to the present embodiment. FIG. 21 is a plan view showing a second dedicated portion of the winding of the coil of the magnetic head according to the present embodiment. FIG. 19 to FIG. 21, the arrow labeled TW indicates the track width direction.

The magnetic head according to the present embodiment differs from the magnetic head according to the first embodiment in the following ways. In the present embodiment, as shown in FIG. 20, the common portion 20 includes two coil elements 20A and 20B extending to pass through the first space SP1 (see FIG. 2). The coil elements 20A and 20B are adjacent to each other in the direction perpendicular to the medium facing surface 80, the coil element 20B being located closer to the medium facing surface 80 than the coil element 20A. The first dedicated portion 21 is connected to the coil element 20A. In FIG. 20 the boundary between the coil element 20A and the first dedicated portion 21 is shown by a dotted line. The coil element 20A has a connection 20AE located near an end of the coil element 20A opposite from the boundary between the coil element 20A and the first dedicated portion 21. The coil element 20B has two connections 20BS and 20BE located near opposite ends of the coil element 20B in the longitudinal direction.

In the present embodiment, as shown in FIG. 21, the second dedicated portion 22 includes two coil elements 22A1 and 22A2 extending to pass through the second space SP2 (see FIG. 2), and three connection layers 22B1, 22B2 and 22B3. The coil elements 22A1 and 22A2 are principal parts of the second dedicated portion 22. The coil elements 22A1 and 22A2 are adjacent to each other in the direction perpendicular to the medium facing surface 80, the coil element 22A2 being located closer to the medium facing surface 80 than the coil element 22A1. The coil elements 22A1 and 22A2 extend along the top surface 15T and the first and second side surfaces S1 and S2 of the main pole 15 without contacting them.

The connection layer 22B1 connects the coil element 22A1 and the coil element 20A. The connection layer 22B2 connects the coil element 22A1 and the coil element 20B. The connection layer 22B3 connects the coil element 22A2 and the coil element 20B. The connection layer 22B1 has a bottom surface in contact with the connection 20AE of the coil element 20A, and a top surface in contact with the bottom surface of the coil element 22A1. The connection layer 22B2 has a bottom surface in contact with the connection 20BS of the coil element 20B, and a top surface in contact with the bottom surface of the coil element 22A1. The connection layer 22B3 has a bottom surface in contact with the connection 20BE of the coil element 20B, and a top surface in contact with the bottom surface of the coil element 22A2.

In the present embodiment, the first dedicated portion 21, the coil element 20A, the connection layer 22B1, the coil element 22A1, the connection layer 22B2, the coil element 20B, the connection layer 22B3, and the coil element 22A2 are connected in series in this order. In FIG. 19 to FIG. 21, the arrows in the common portion 20 and the dedicated portions 21 and 22 indicate the direction of current flowing through the coil at some point in time.

Each of the coil elements 20A and 20B of the common portion 20 surrounds approximately ¾ of the outer peripheral surface 32S of the first coupling section 32. The first dedicated portion 21 surrounds approximately ¼ of the outer peripheral surface 32S of the first coupling section 32. Thus, the first coil portion 11 constituted by the common portion 20 and the first dedicated potion 21 is of approximately 1.75 turn.

The coil element 20A of the common portion 20 and the coil element 22A1 of the second dedicated portion 22 are connected to each other via the connection layer 22B1 to constitute a part of the second coil element 12. This part of the second coil element 12 surrounds almost the entire perimeter of the main pole 15 as viewed from the medium facing surface 80. The coil element 20B of the common portion 20 and the coil element 22A2 of the second dedicated portion 22 are connected to each other via the connection layer 22B3 to constitute another part of the second coil element 12. This part of the second coil element 12 also surrounds almost the entire perimeter of the main pole 15 as viewed from the medium facing surface 80. Thus, the number of turns of the second coil portion 12 is approximately two.

In the present embodiment, the total number of turns of the first and second coil portions 11 and 12 is approximately 3.75, which is larger than the total number of turns of the first and second coil portions 11 and 12 in the first embodiment. The present embodiment thus allows the coil to provide a larger magnetomotive force.

The remainder of configuration, function and effects of the present embodiment are similar to those of the first embodiment.

Fifth Embodiment

Figure 22:
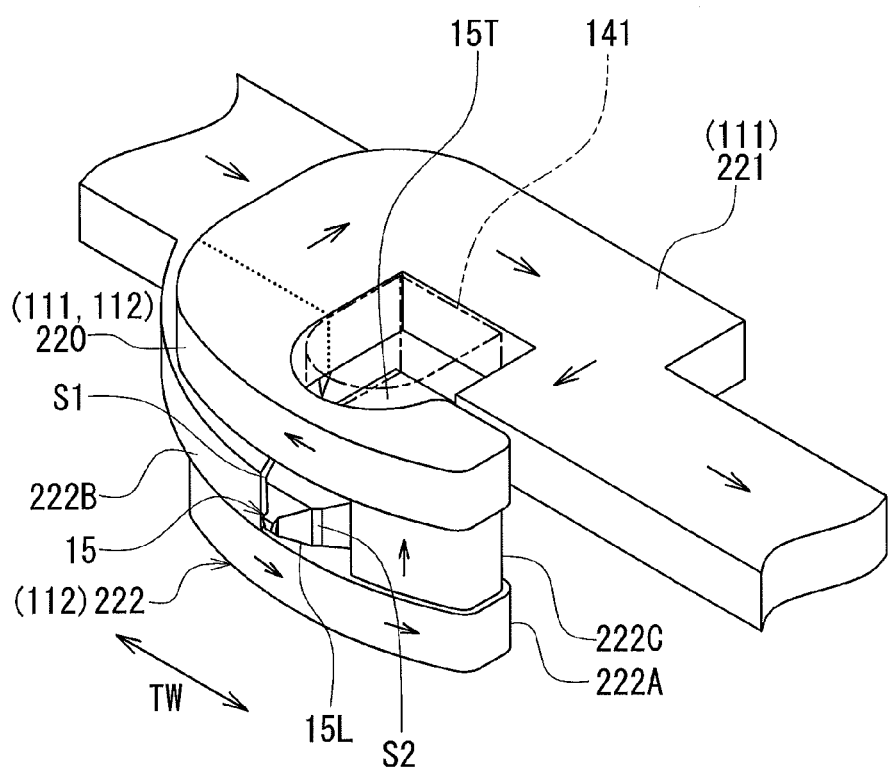
FIG. 22 is a perspective view showing the main part of a magnetic head according to a fifth embodiment of the invention.
Figure 23:
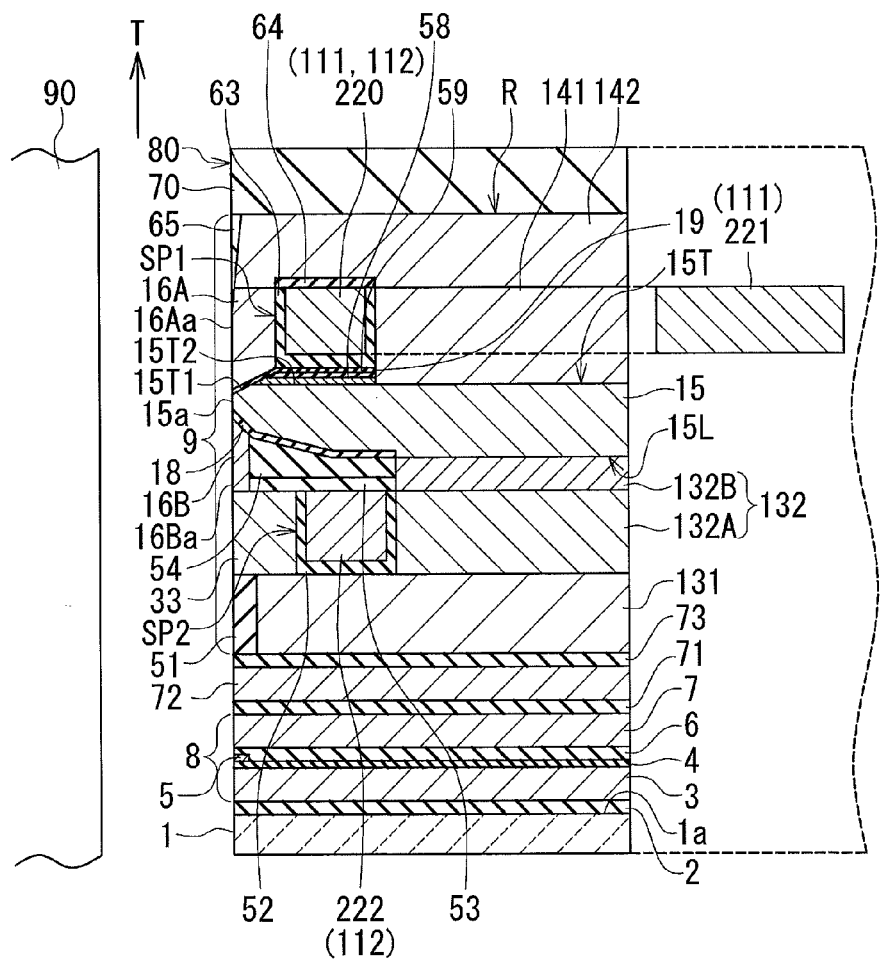
FIG. 23 is a cross-sectional view of the magnetic head according to the fifth embodiment of the invention.
Figure 24:
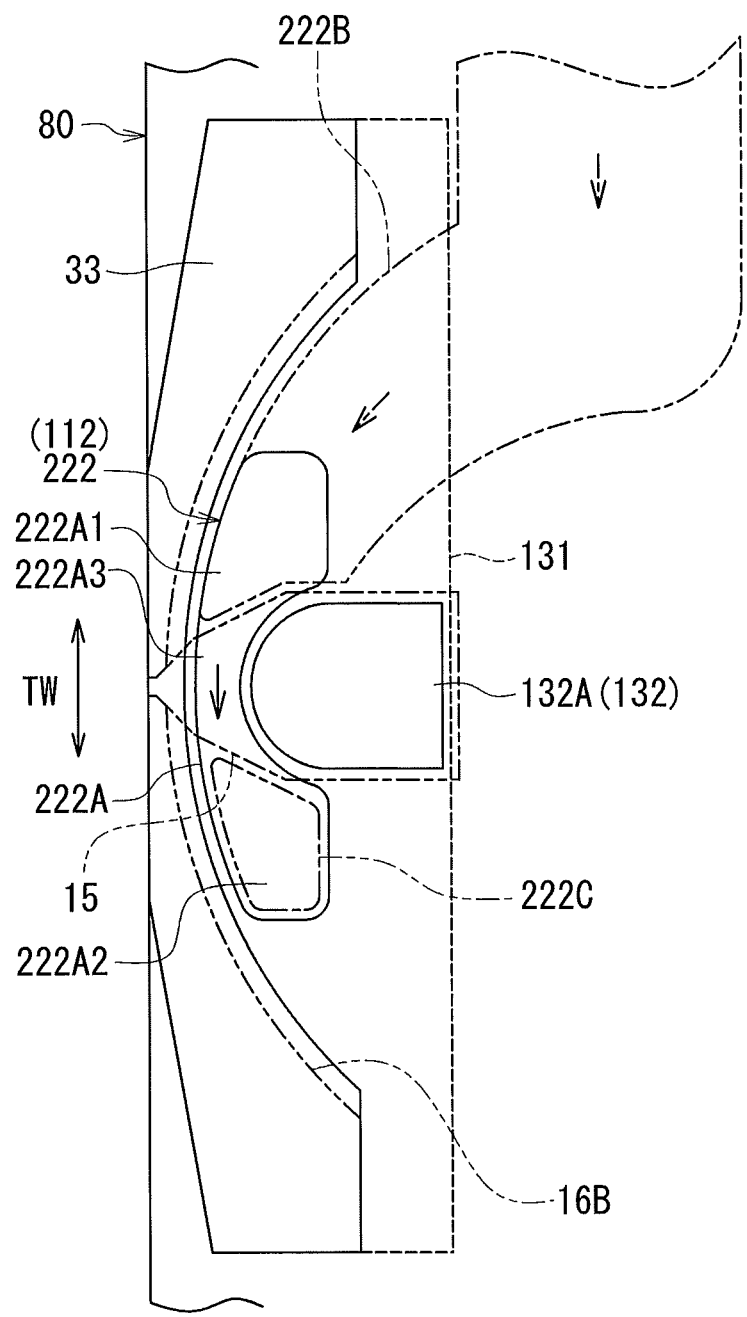
FIG. 24 is a plan view showing a second dedicated portion of the winding of the coil of the magnetic head according to the fifth embodiment of the invention.
Figure 25:
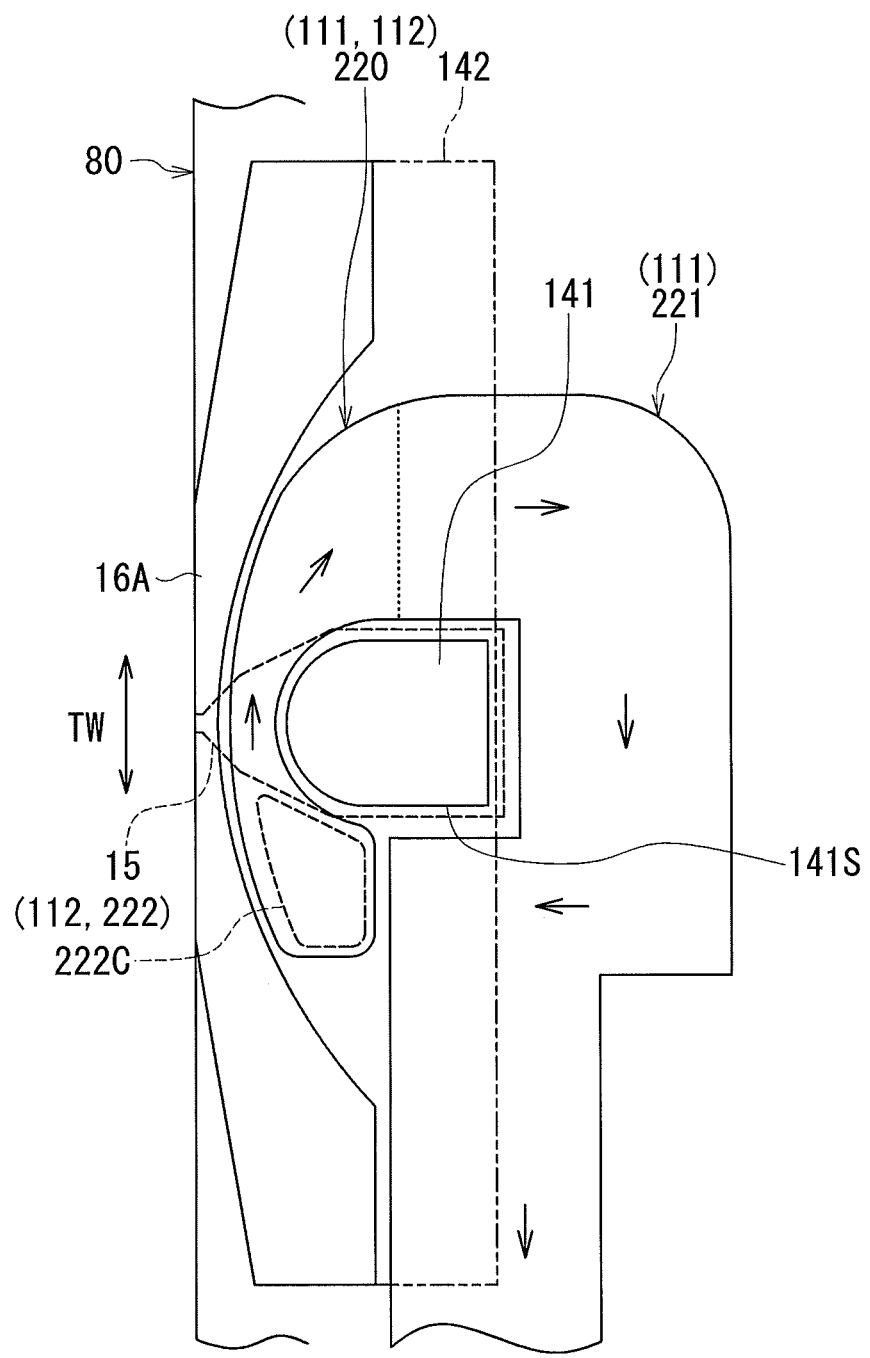
FIG. 25 is a plan view showing a common portion and a first dedicated portion of the winding of the coil of the magnetic head according to the fifth embodiment of the invention.

A magnetic head according to a fifth embodiment of the present invention will now be described with reference to FIG. 22 to FIG. 25. FIG. 22 is a perspective view showing the main part of the magnetic head according to the present embodiment. FIG. 23 is a cross-sectional view of the magnetic head according to the present embodiment. The arrow labeled T in FIG. 23 indicates the direction of travel of a recording medium. FIG. 24 is a plan view showing a second dedicated portion of the winding of the coil of the magnetic head according to the present embodiment. FIG. 25 is a plan view showing a common portion and a first dedicated portion of the winding of the coil of the magnetic head according to the present embodiment. In FIG. 22, FIG. 24 and FIG. 25, the arrow labeled TW indicates the track width direction.

The magnetic head according to the present embodiment differs from the magnetic head according to the first embodiment in the following ways. The return path section R of the present embodiment includes a first yoke section 142, a second yoke section 131, a first coupling section 141 and a second coupling section 132, in place of the first yoke section 31, the second yoke section 42, the first coupling section 32 and the second coupling section 41 of the first embodiment. The first yoke section 142, the second yoke section 131, the first coupling section 141 and the second coupling section 132 are shaped and located in the same manner as the second yoke section 42, the first yoke section 31, the second coupling section 41 and the first coupling section 32 of the first embodiment, respectively. More specifically, the first yoke section 142 lies at a different location from the main pole 15 in the direction T of travel of the recording medium 90. The second yoke section 131 is located on a side of the main pole 15 opposite from the first yoke section 142. In the present embodiment, the first yoke section 142 is located on the trailing side, i.e., the front side in the direction T of travel of the recording medium 90, relative to the main pole 15. The second yoke section 131 is located on the leading side, i.e., the rear side in the direction T of travel of the recording medium 90, relative to the main pole 15.

The first coupling section 141 is located away from the medium facing surface 80 and couples the first yoke section 141 to the main pole 15. The second coupling section 132 is located away from the medium facing surface 80 and couples the second yoke section 131 to the main pole 15. The second coupling section 132 includes a first layer 132A lying on the second yoke section 131 and a second layer 132B lying on the first layer 132A.

As shown in FIG. 23 and FIG. 25, the first coupling section 141 has a top surface in contact with the first yoke section 142, a bottom surface in contact with the main pole 15, and an outer peripheral surface 141S connecting the top surface and the bottom surface. The outer peripheral surface 141S is in contact with neither of the main pole 15 and the first yoke section 142.

As has been described in relation to the first embodiment, the return path section R includes the first and second magnetic path portions. The first space SP1 is defined by the main pole 15 and the first magnetic path portion. The second space SP2 is defined by the main pole 15 and the second magnetic path portion. In the present embodiment, the first magnetic path portion is constituted by the top shield 16A, the first yoke section 142 and the first coupling section 141. The second magnetic path portion is constituted by the bottom shield 16B, the third coupling section 33, the second yoke section 131 and the second coupling section 132. The first space SP1 is a space between the main pole 15 and the first yoke section 142 and also between the top shield 16A and the first coupling section 141. The second space SP2 is a space between the main pole 15 and the second yoke section 131 and also between the second coupling section 132 and each of the bottom shield 16B and the third coupling section 33.

The coil of the present embodiment includes a first coil portion 111 and a second coil portion 112, in place of the first coil portion 11 and the second coil portion 12 of the first embodiment. The first coil portion 111 and the second coil portion 112 are connected in series. The first coil portion 111 passes through the first space SP1 only. The second coil portion 112 passes through both of the first space SP1 and the second space SP2.

As shown in FIG. 25, the first coil portion 111 is wound around the first coupling section 141. The insulating films 63 and 64 and the non-illustrated nonmagnetic layer described in the first embodiment section are disposed around the first coil portion 111. The top surfaces of the first coil portion 111, the top shield 16A, the first coupling section 141, the insulating film 63 and the non-illustrated nonmagnetic layer are even with each other.

As shown in FIG. 22, the second coil portion 112 is wound around the main pole 15. The insulating films 52 and 63, the insulating layer 53, the non-illustrated insulating layer and the non-illustrated nonmagnetic layer described in the first embodiment section are disposed around the second coil portion 112.

The coil of the present embodiment will now be described in more detail. In the present embodiment, the winding of the coil is used to form the first and second coil portions 111 and 112. The winding includes a common portion 220, a first dedicated portion 221 and a second dedicated portion 222, in place of the common portion 20, the first dedicated portion 21 and the second dedicated portion 22 of the first embodiment. The common portion 220 is used in common to form part of the first coil portion 111 and part of the second coil portion 112. The first dedicated portion 221 is connected to the common portion 220, and is used to form the remainder of the first coil portion 111. The second dedicated portion 222 is connected to the common portion 220, and is used to form the remainder of the second coil portion 112. In FIG. 22 and FIG. 25, the boundary between the common portion 220 and the first dedicated portion 221 is shown by a dotted line.

The first coil portion 111 surrounds at least part of the outer peripheral surface 141S of the first coupling section 141. In the present embodiment, in particular, the first coil portion 111 is of one turn or less. In the example shown in FIG. 25, the first coil portion 111 extends approximately once around the first coupling section 141. Thus, the first coil portion 111 is of substantially one turn. The common portion 220 is formed only of a single coil element extending to pass through the first space SP1. The first dedicated portion 221 is coplanar with the common portion 220. The common portion 220 has a connection located near an end of the common portion 220 opposite from the boundary between the common portion 220 and the first dedicated portion 221.

The second coil portion 112 surrounds at least part of the entire perimeter of the main pole 15 as viewed from the medium facing surface 80. In the present embodiment, in particular, the second coil portion 112 is of one turn or less. In the example shown in FIG. 22, the second coil portion 112 extends approximately once around the main pole 15. Thus, the second coil portion 112 is of substantially one turn. The second dedicated portion 222 is located on the rear side in the direction T of travel of the recording medium 90 relative to the common portion 220. Part of the main pole 15 is interposed between the common portion 220 and the second dedicated portion 222.

As shown in FIG. 22, FIG. 24 and FIG. 25, the second dedicated portion 222 includes two coil elements 222A and 222B, and a connection layer 222C. The coil element 222A extends to pass through the second space SP2. The coil element 222B and the connection layer 222C are located on opposite sides of the main pole 15 in the track width direction TW. As shown in FIG. 24, the coil element 222A includes a first side portion 222A1, a second side portion 222A2, and a middle portion 222A3. The first side portion 222A1 and the second side portion 222A2 are located on opposite sides of the main pole 15 in the track width direction TW. The middle portion 222A3 is located between the first side portion 222A1 and the second side portion 222A2. Part of the coil element 222B lies on the first side portion 222A1. The connection layer 222C lies on the second side portion 222A2 and connects the connection of the common portion 220 and the second side portion 222A2. The second dedicated portion 222, which includes the coil elements 222A and 222B and the connection layer 222C, extends along the bottom surface 15L and the first and second side surfaces S1 and S2 of the main pole 15 without contacting them.

In the present embodiment, the first dedicated portion 221, the common portion 220 and the second dedicated portion 222 are connected in series in this order. In FIG. 22, FIG. 24 and FIG. 25, the arrows in the common portion 220 and the dedicated portions 221 and 222 indicate the direction of current flowing through the coil at some point in time.

Now, functions and effects specific to the magnetic head according to the present embodiment will be described. With increases in frequency of write signals for higher recording densities, it is required of the magnetic head to provide an improved rate of change in the direction of the magnetic flux produced from the end face 15a of the main pole 15. Further, the position of an end of a record bit is determined by an end of the end face 15a of the main pole 15 located in the medium facing surface 80, the end being located on the front side in the direction T of travel of the recording medium 90. To achieve higher recording densities, it is thus required to improve not only the rate of change in the direction of the magnetic flux produced from the end face 15a of the main pole 15, but also the rate of change in the direction of the magnetic flux passing through the top shield 16A. To meet the requirements, it is effective to shorten one of the magnetic path portions of the return path section R, i.e., the first magnetic path portion including the top shield 16A, and to supply a large magnetomotive force to the first magnetic path portion.

Now, we will contemplate a magnetic head of a comparative example in which the first and second coil portions are formed as completely separate portions, like the magnetic head disclosed in U.S. Pat. No. 8,810,963 B1. To obtain a magnetomotive force equal to that obtained in the magnetic head according to the present embodiment, it is necessary in the magnetic head of the comparative example that each of the first and second coil portions be of approximately one turn. In the magnetic head of the comparative example, if the first coil portion is placed at the same location as the first coil portion 111 of the present embodiment, then two coil elements pass through a space corresponding to the first space SP1 of the present embodiment.

According to the present embodiment, in contrast, only the common portion 220 passes through the first space SP1, that is, only a single coil element passes through the first space SP1. The present embodiment thus allows the first magnetic path portion to be shorter than in the magnetic head of the comparative example. Further, according to the present embodiment, since the first and second coil portions 111 and 112 supply magnetomotive force to the first magnetic path portion, the supplied magnetomotive force is larger. By virtue of the foregoing, the present embodiment makes it possible to achieve an improved rate of change in the direction of the magnetic flux produced from the end face 15a of the main pole 15 and an improved rate of change in the direction of the magnetic flux passing through the top shield 16A. As a result, it becomes possible to increase the recording density.

The remainder of configuration, function and effects of the present embodiment are similar to those of the first embodiment.

Sixth Embodiment

Figure 26:
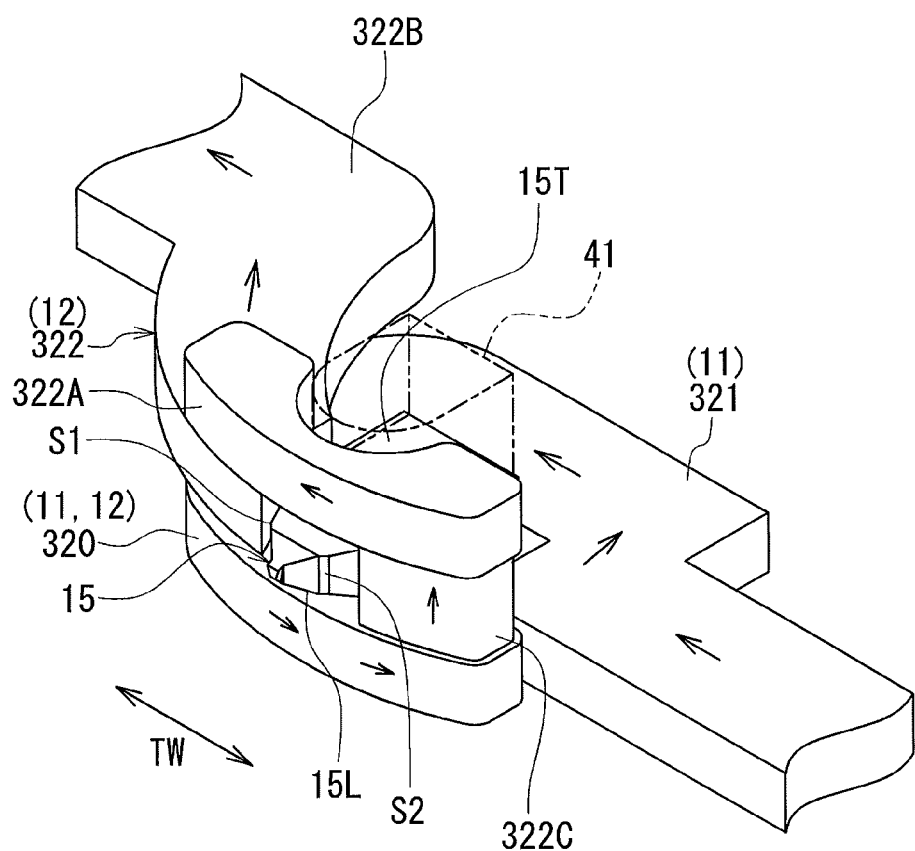
FIG. 26 is a perspective view showing the main part of a magnetic head according to a sixth embodiment of the invention.
Figure 27:
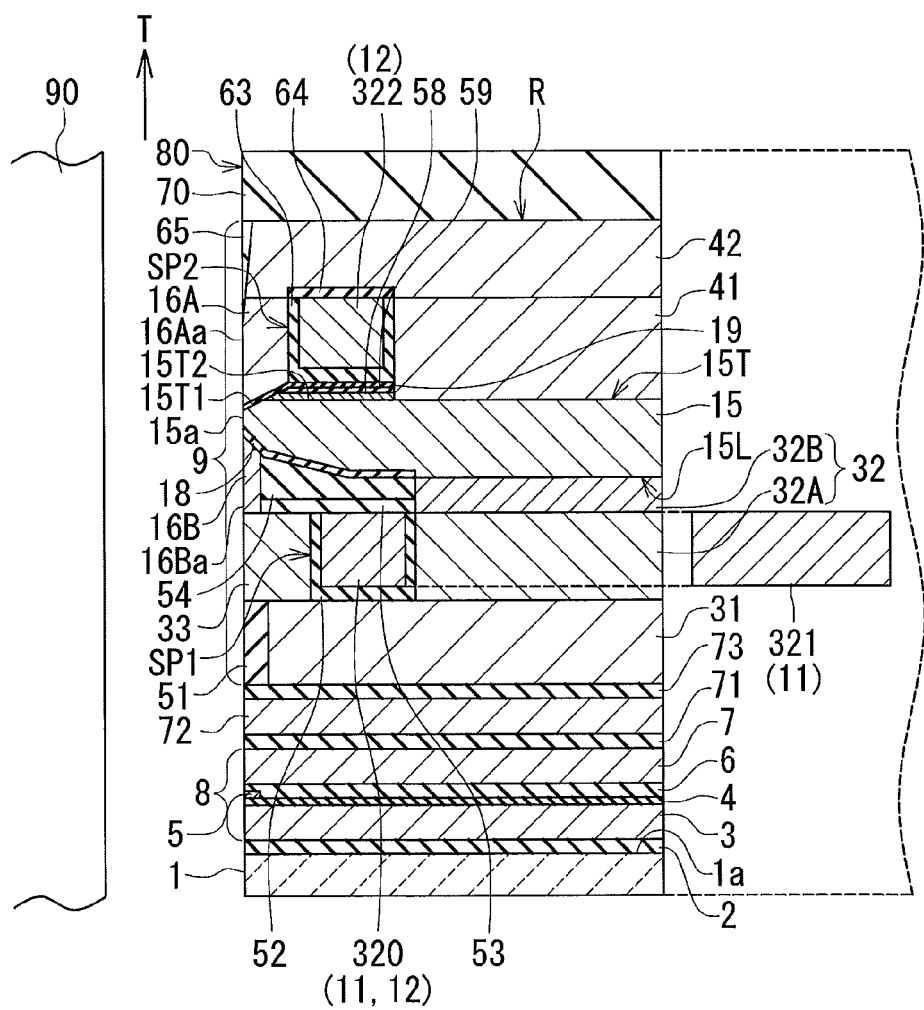
FIG. 27 is a cross-sectional view of the magnetic head according to the sixth embodiment of the invention.
Figure 28:
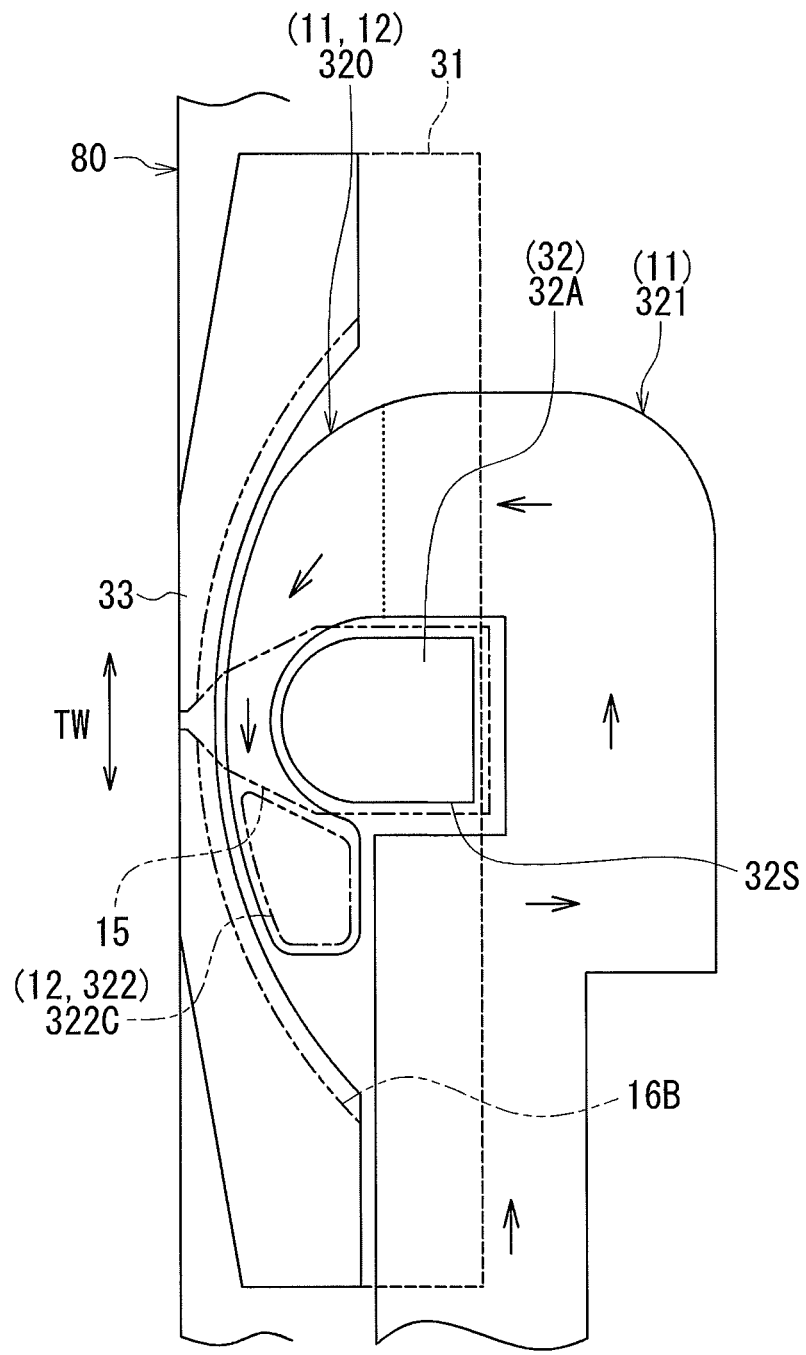
FIG. 28 is a plan view showing a common portion and a first dedicated portion of the winding of the coil of the magnetic head according to the sixth embodiment of the invention.
Figure 29:
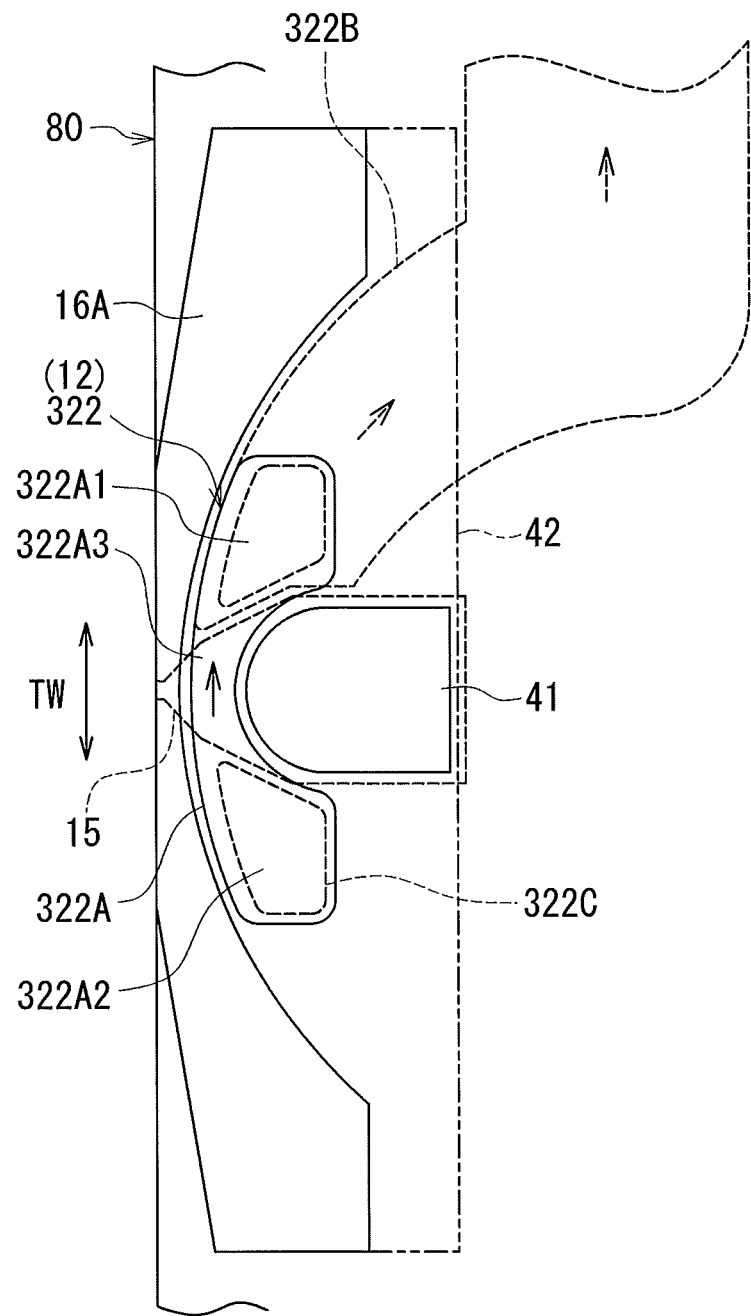
FIG. 29 is a plan view showing a second dedicated portion of the winding of the coil of the magnetic head according to the sixth embodiment of the invention.

A magnetic head according to a sixth embodiment of the present invention will now be described with reference to FIG. 26 to FIG. 29. FIG. 26 is a perspective view showing the main part of the magnetic head according to the present embodiment. FIG. 27 is a cross-sectional view of the magnetic head according to the present embodiment. The arrow labeled T in FIG. 27 indicates the direction of travel of a recording medium. FIG. 28 is a plan view showing a common portion and a first dedicated portion of the winding of the coil of the magnetic head according to the present embodiment. FIG. 29 is a plan view showing a second dedicated portion of the winding of the coil of the magnetic head according to the present embodiment. In FIG. 26, FIG. 28 and FIG. 29, the arrow labeled TW indicates the track width direction.

The magnetic head according to the present embodiment differs from the magnetic head according to the first embodiment in the following ways. The winding of the coil of the present embodiment includes a common portion 320, a first dedicated portion 321 and a second dedicated portion 322, in place of the common portion 20, the first dedicated portion 21 and the second dedicated portion 22 of the first embodiment. The common portion 320 is used in common to form part of the first coil portion 11 and part of the second coil portion 12. The first dedicated portion 321 is connected to the common portion 320, and is used to form the remainder of the first coil portion 11. The second dedicated portion 322 is connected to the common portion 320, and is used to form the remainder of the second coil portion 12. In FIG. 28 the boundary between the common portion 320 and the first dedicated portion 321 is shown by a dotted line.

The common portion 320 is formed only of a single coil element extending to pass through the first space SP1. The first dedicated portion 321 is coplanar with the common portion 320. The common portion 320 has a connection located near an end of the common portion 320 opposite from the boundary between the common portion 320 and the first dedicated portion 321. The second dedicated portion 322 is located on the front side in the direction T of travel of the recording medium 90 relative to the common portion 320. Part of the main pole 15 is interposed between the common portion 320 and the second dedicated portion 322.

As shown in FIG. 26, FIG. 28 and FIG. 29, the second dedicated portion 322 includes two coil elements 322A and 322B, and a connection layer 322C. The coil element 322A extends to pass through the second space SP2. The coil element 322B and the connection layer 322C are located on opposite sides of the main pole 15 in the track width direction TW. As shown in FIG. 29, the coil element 322A includes a first side portion 322A1, a second side portion 322A2, and a middle portion 322A3. The first side portion 322A1 and the second side portion 322A2 are located on opposite sides of the main pole 15 in the track width direction TW. The middle portion 322A3 is located between the first side portion 322A1 and the second side portion 322A2. The first side portion 322A1 lies on part of the coil element 322B. The connection layer 322C lies on the connection of the common portion 320 and connects the connection of the common portion 320 and the second side portion 322A2. The second dedicated portion 322, which includes the coil elements 322A and 322B and the connection layer 322C, extends along the top surface 15T and the first and second side surfaces S1 and S2 of the main pole 15 without contacting them.

In the present embodiment, the first dedicated portion 321, the common portion 320 and the second dedicated portion 322 are connected in series in this order. In FIG. 26, FIG. 28 and FIG. 29, the arrows in the common portion 320 and the dedicated portions 321 and 322 indicate the direction of current flowing through the coil at some point in time.

The present embodiment provides functions and effects different from those of the fifth embodiment as described below. The fifth embodiment allows a larger magnetomotive force to be supplied to one of the magnetic path portions of the return path section R, i.e., the magnetic path portion including the top shield 16A, than to the other magnetic path portion including the bottom shield 16B. This enhances the effect of improving the write characteristics of the magnetic head.

In contrast, the present embodiment allows a larger magnetomotive force to be supplied to the magnetic path portion including the bottom shield 16B than to the magnetic path portion including the top shield 16A, in the return path section R. This enhances the effect of preventing ATE and WATE.

Either one of the fifth and sixth embodiments can be employed depending on whether emphasis is on the effect of improving the write characteristics or the effect of preventing ATE and WATE.

The remainder of configuration, function and effects of the present embodiment are similar to those of the first embodiment.

Seventh Embodiment

Figure 30:
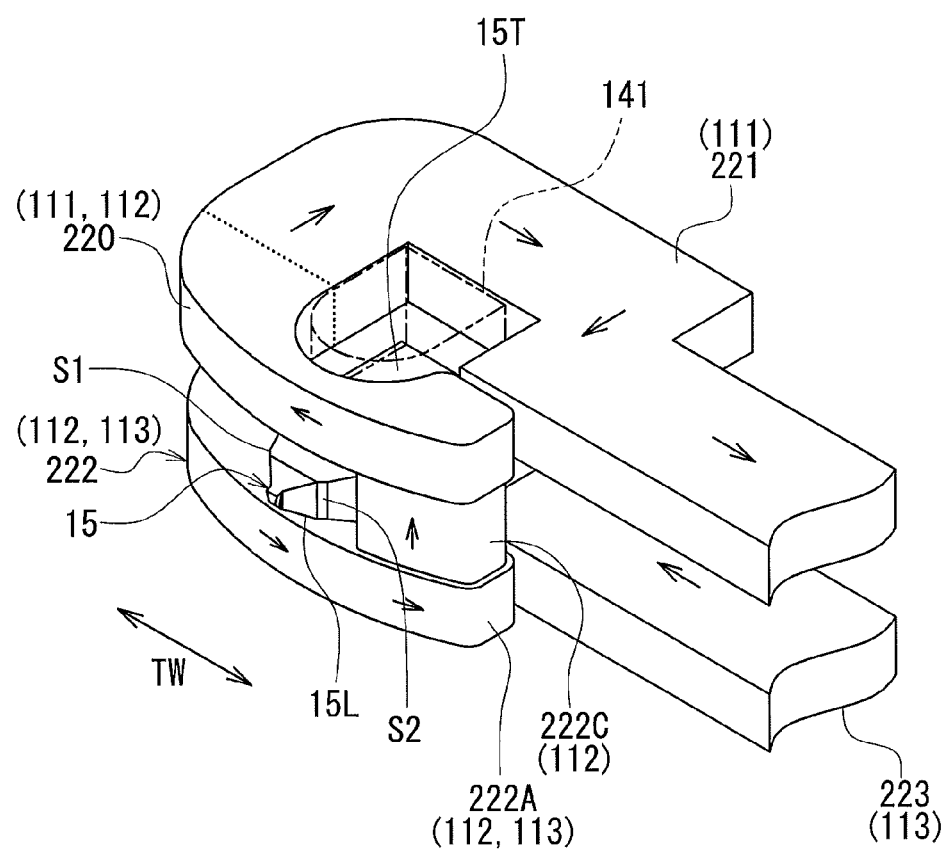
FIG. 30 is a perspective view showing the main part of a magnetic head according to a seventh embodiment of the invention.
Figure 31:
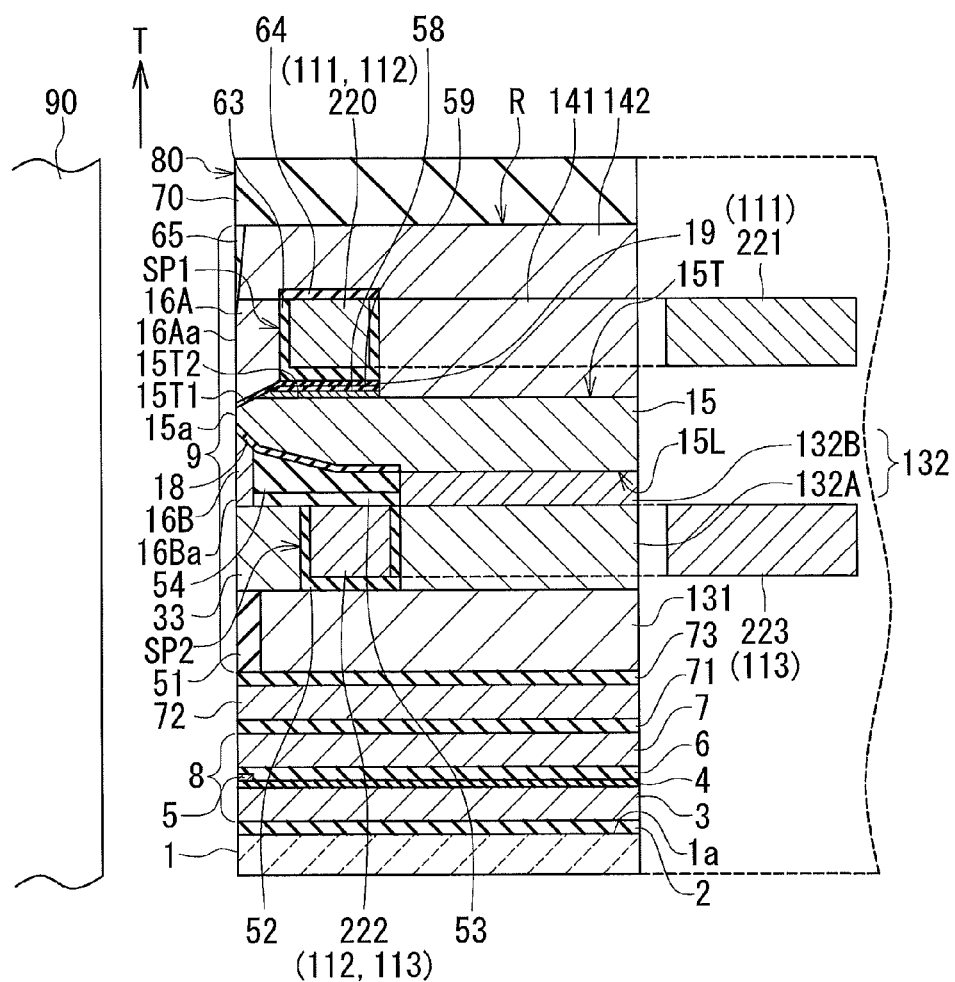
FIG. 31 is a cross-sectional view of the magnetic head according to the seventh embodiment of the invention.
Figure 32:
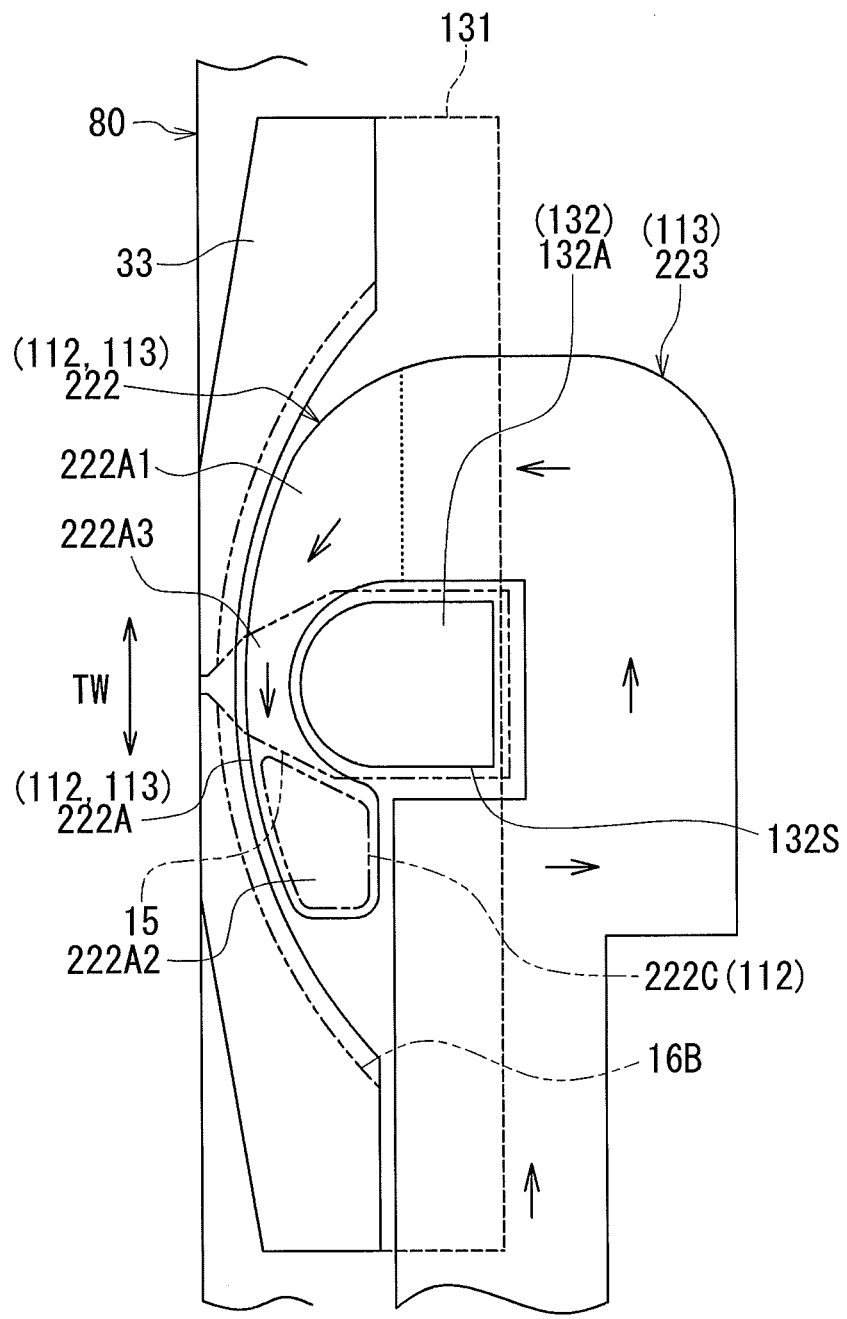
FIG. 32 is a plan view showing a second dedicated portion and a third dedicated portion of the winding of the coil of the magnetic head according to the seventh embodiment of the invention.
Figure 33:
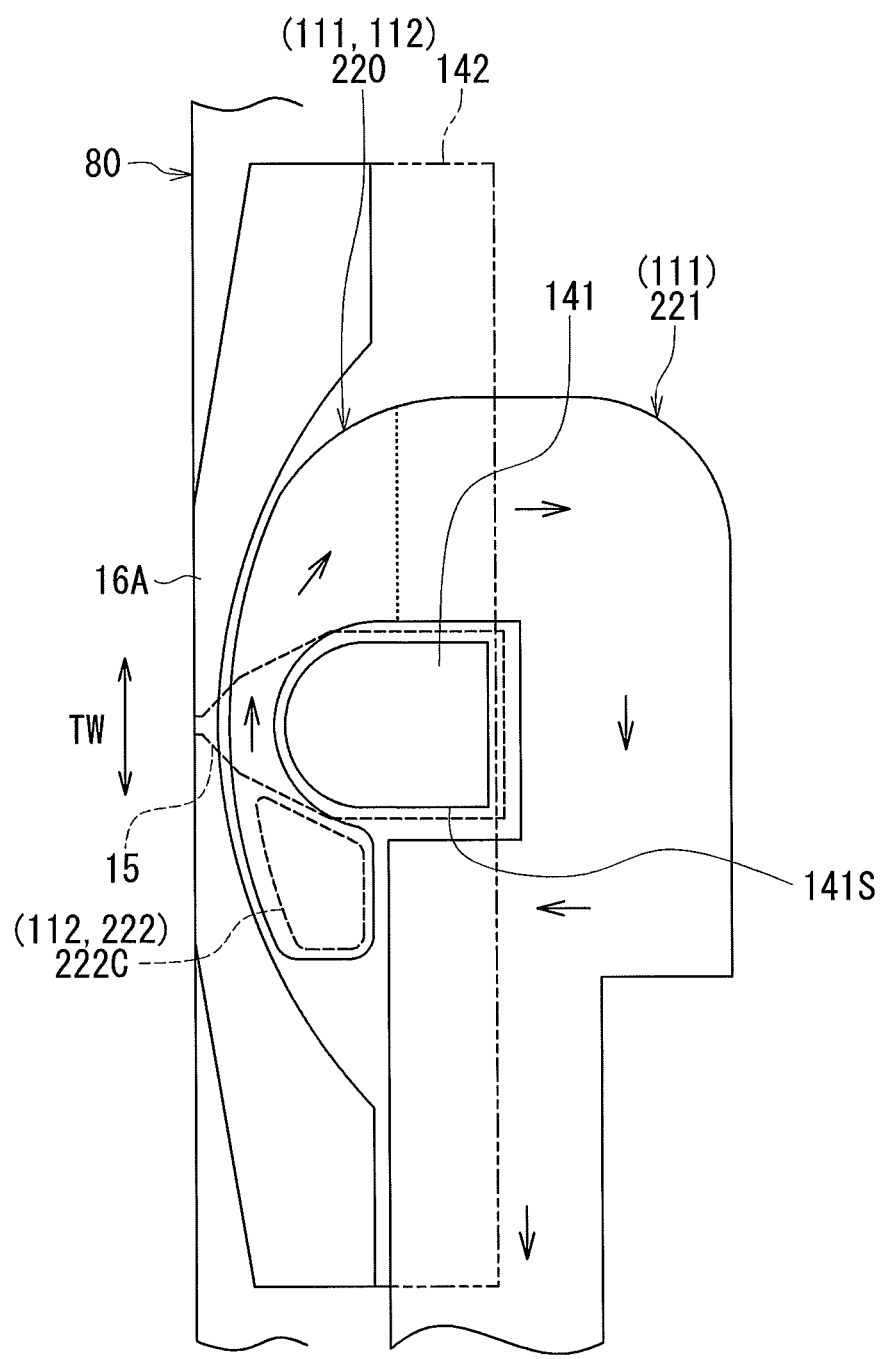
FIG. 33 is a plan view showing a common portion and a first dedicated portion of the winding of the coil of the magnetic head according to the seventh embodiment of the invention.

A magnetic head according to a seventh embodiment of the present invention will now be described with reference to FIG. 30 to FIG. 33. FIG. 30 is a perspective view showing the main part of the magnetic head according to the present embodiment. FIG. 31 is a cross-sectional view of the magnetic head according to the present embodiment. The arrow labeled T in FIG. 31 indicates the direction of travel of a recording medium. FIG. 32 is a plan view showing a common portion and a first dedicated portion of the winding of the coil of the magnetic head according to the present embodiment. FIG. 33 is a plan view showing a second dedicated portion of the winding of the coil of the magnetic head according to the present embodiment. In FIG. 30, FIG. 32 and FIG. 33, the arrow labeled TW indicates the track width direction.

The magnetic head according to the present embodiment differs from the magnetic head according to the fifth embodiment in the following ways. In the present embodiment, the second coil portion 112 of the coil surrounds approximately ¾ of the entire perimeter of the main pole 15. Thus, the second coil portion 112 is of approximately 0.75 turn. Further, of the components of the second dedicated portion 222 of the winding of the coil described in the fifth embodiment section, the coil element 222B is not provided in the present embodiment. The second dedicated portion 222 extends along the bottom surface 15L and the second side surface S2 of the main pole 15 without contacting them.

The coil of the present embodiment includes a third coil portion 113 in addition to the first and second coil portions 111 and 112. As shown in FIG. 31 and FIG. 32, the second coupling section 132 has a top surface in contact with the main pole 15, a bottom surface in contact with the second yoke section 131, and an outer peripheral surface 132S connecting the top surface and the bottom surface. The outer peripheral surface 132S is in contact with neither of the main pole 15 and the second yoke section 131. The third coil portion 113 is coplanar with part of the second coil portion 112, and surrounds at least part of the outer peripheral surface 132S of the second coupling section 132. In the present embodiment, in particular, the third coil portion 113 is of one turn or less. In the example shown in FIG. 32, the third coil portion 113 extends approximately once around the second coupling section 132. Thus, the third coil portion 113 is of substantially one turn.

The winding of the coil of the present embodiment includes a third dedicated portion 223 in addition to the common portion 220, the first dedicated portion 221 and the second dedicated portion 222. The third dedicated portion 223 is used to form at least part of the third coil portion 113. The third dedicated portion 223 is connected to the first side portion 222A1 of the coil element 222A of the second dedicated portion 222.

In the present embodiment, the coil element 222A extends to pass through between the main pole 15 and the second yoke section 131, and is used in common to form part of the third coil portion 113 and part of the second coil portion 112. The coil element 222A thus corresponds to the first portion of the second dedicated portion in the present invention. As has been described in the fifth embodiment section, the connection layer 222C of the second dedicated portion 222 connects the coil element 222A or the aforementioned first portion to the common portion 220. Thus, in the present embodiment, the connection layer 222C corresponds to the second portion of the second dedicated portion in the present invention.

In the present embodiment, the first dedicated portion 221, the common portion 220, the second dedicated portion 222, and the third dedicated portion 223 are connected in series in this order. In FIG. 30, FIG. 32 and FIG. 33, the arrows in the common portion 220 and the dedicated portions 221, 222 and 223 indicate the direction of current flowing through the coil at some point in time.

In the present embodiment, the total number of turns of the first to third coil portions 111 to 113 is approximately 2.74, which is larger than the total number of turns of the first and second coil portions 111 and 112 of the fifth embodiment. The present embodiment thus allows the coil to provide a larger magnetomotive force.

The remainder of configuration, function and effects of the present embodiment are similar to those of the fifth embodiment.

Eighth Embodiment

Figure 34:
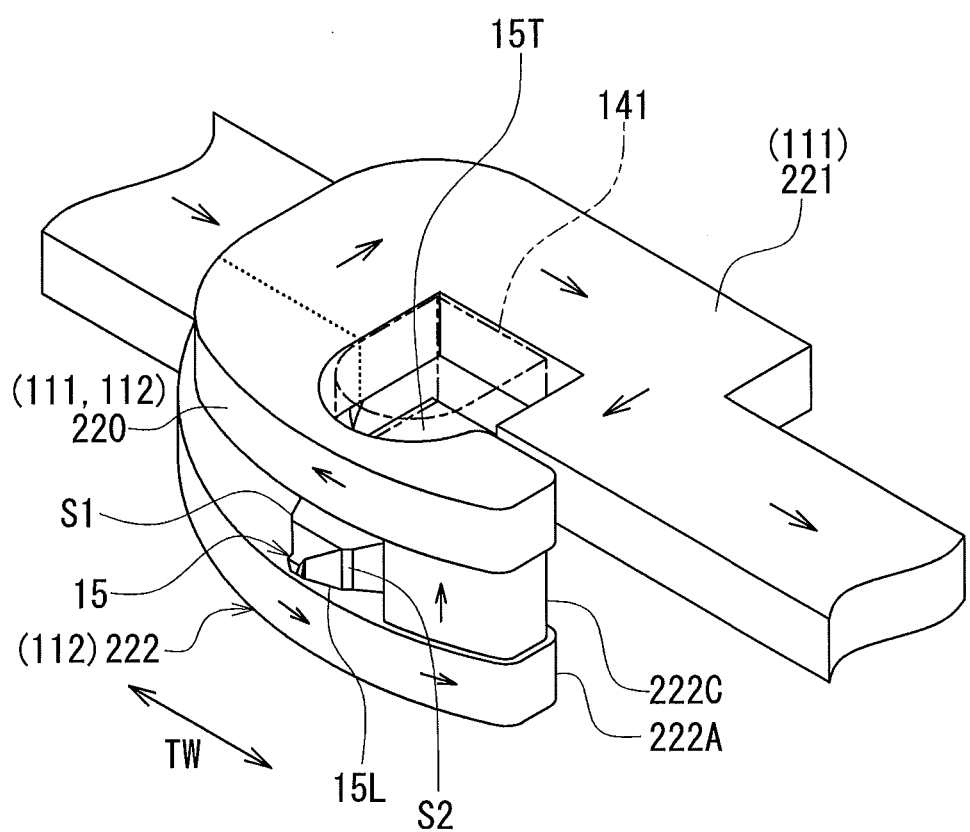
FIG. 34 is a perspective view showing the main part of a magnetic head according to an eighth embodiment of the invention.

A magnetic head according to an eighth embodiment of the present invention will now be described with reference to FIG. 34. FIG. 34 is a perspective view showing the main part of the magnetic head according to the present embodiment. The arrow labeled TW in FIG. 34 indicates the track width direction. In FIG. 34, the arrows in the common portion 220 and the dedicated portions 221 and 222 indicate the direction of current flowing through the coil at some point in time.

The magnetic head according to the present embodiment differs from the magnetic head according to the fifth embodiment in the following ways. In the present embodiment, the second coil portion 112 of the coil surrounds approximately ¾ of the entire perimeter of the main pole 15. Thus, the second coil portion 112 is of approximately 0.75 turn. Further, the second dedicated portion 222 of the winding of the coil includes only the coil element 222A and the connection layer 222C, and does not include the coil element 222B. The planar shape (the shape as viewed from above) of the coil element 222A of the present embodiment is the same as that of the coil elements 222A and 222B in combination (see FIG. 24) in the fifth embodiment. In the present embodiment, the second dedicated portion 222 extends along the bottom surface 15L and the second side surface S2 of the main pole 15 without contacting them.

The magnetic head according to the present embodiment differs from the magnetic head according to the seventh embodiment in that the coil does not include the third coil portion 113 and the winding of the coil does not include the third dedicated portion 223.

The remainder of configuration, function and effects of the present embodiment are similar to those of the fifth or seventh embodiment.

The present invention is not limited to the foregoing embodiments, and various modifications may be made thereto. In the present invention, as far as the requirements of the appended claims are met, each of the first to third coil portions may be of any number of turns. For example, when the coil includes the first and second coil portions, the first coil portion may be of approximately two turns or more, while the second coil portion may be of approximately one turn. In this case, the second coil portion is constituted by, for example, a common portion and a second dedicated portion having the same shape as the common portion 20 and the second dedicated portion 22 of the first embodiment, respectively. The first coil portion is constituted by, for example, the common portion and a first dedicated portion of more than one turn. In this example, the first dedicated portion, the common portion and the second dedicated portion may be connected in series in this order.

Further, the magnetic head of the present invention may be provided with a means for applying heat or a microwave magnetic field to a recording medium to serve as a thermally-assisted or microwave-assisted magnetic recording head.

Obviously, many modifications and variations of the present invention are possible in the light of the above teachings. Thus, it is to be understood that, within the scope of the appended claims and equivalents thereof, the invention may be practiced in other than the foregoing most preferable embodiments.

What is claimed is:

1. A magnetic head for perpendicular magnetic recording, comprising:
   a medium facing surface configured to face a recording medium;
   a coil for producing a magnetic field corresponding to data to be written on the recording medium;
   a main pole having an end face located in the medium facing surface, the main pole being configured to pass a magnetic flux corresponding to the magnetic field produced by the coil, and to produce a write magnetic field for use to write the data on the recording medium by means of a perpendicular magnetic recording system; and
   a return path section formed of a magnetic material, connected to the main pole and configured to pass a magnetic flux corresponding to the magnetic field produced by the coil, wherein
   the return path section includes a first yoke section and a first coupling section, the first yoke section lying at a different location from the main pole in a direction of travel of the recording medium, the first coupling section being located away from the medium facing surface and coupling the first yoke section to the main pole,
   the first coupling section has an outer peripheral surface in contact with neither of the main pole and the first yoke section,
   the coil includes a first coil portion and a second coil portion,
   the first coil portion surrounds at least part of the outer peripheral surface of the first coupling section,
   the second coil portion surrounds at least part of an entire perimeter of the main pole as viewed from the medium facing surface,
   the coil includes a winding for forming the first and second coil portions, and
   the winding includes:
   a common portion extending to pass through between the main pole and the first yoke section, and used in common to form part of the first coil portion and part of the second coil portion;
   a first dedicated portion connected to the common portion and used to form the remainder of the first coil portion; and
   a second dedicated portion connected to the common portion and used to form the remainder of the second coil portion.

2. The magnetic head for perpendicular magnetic recording according to claim 1, wherein the first dedicated portion, the common portion and the second dedicated portion are connected in series in this order.

3. The magnetic head for perpendicular magnetic recording according to claim 1, wherein
   the first dedicated portion includes a first connection and a second connection at mutually different locations,
   the second dedicated portion includes a third connection and a fourth connection at mutually different locations,
   the first connection and the third connection are connected to each other, and
   the second connection and the fourth connection are connected to each other, and connected to the common portion.

4. The magnetic head for perpendicular magnetic recording according to claim 1, wherein each of the first and second coil portions is of one turn or less, and the common portion is formed only of a single coil element.

5. The magnetic head for perpendicular magnetic recording according to claim 1, wherein
   the return path section further includes a second yoke section and a second coupling section, the second yoke section being located on a side of the main pole opposite from the first yoke section, the second coupling section being located away from the medium facing surface and coupling the second yoke section to the main pole,
   the second coupling section has an outer peripheral surface in contact with neither of the main pole and the second yoke section,
   the coil further includes a third coil portion surrounding at least part of the outer peripheral surface of the second coupling section,
   the winding further includes a third dedicated portion used to form at least part of the third coil portion, and
   the first dedicated portion, the common portion, the second dedicated portion and the third dedicated portion are connected in series in this order.

6. The magnetic head for perpendicular magnetic recording according to claim 5, wherein the second dedicated portion includes: a first portion extending to pass through between the main pole and the second yoke section and used in common to form part of the third coil portion and part of the second coil portion; and a second portion connecting the first portion to the common portion.

7. The magnetic head for perpendicular magnetic recording according to claim 1, wherein the first yoke section is located on a rear side in the direction of travel of the recording medium relative to the main pole.

8. The magnetic head for perpendicular magnetic recording according to claim 7, wherein
   the main pole includes: a bottom surface located at a rear-side end in the direction of travel of the recording medium; a top surface located at a front-side end in the direction of travel of the recording medium; and a first side surface and a second side surface located at opposite ends in a track width direction, and
   the second dedicated portion extends along the top surface and the first and second side surfaces of the main pole without contacting them.

9. The magnetic head for perpendicular magnetic recording according to claim 1, wherein the first yoke section is located on a front side in the direction of travel of the recording medium relative to the main pole.

10. The magnetic head for perpendicular magnetic recording according to claim 9, wherein
    the main pole includes: a bottom surface located at a rear-side end in the direction of travel of the recording medium; a top surface located at a front-side end in the direction of travel of the recording medium; and a first side surface and a second side surface located at opposite ends in a track width direction, and
    the second dedicated portion extends along the bottom surface and the first and second side surfaces of the main pole without contacting them.

* * * * *